US011372616B2

(12) United States Patent
Liddell et al.

(10) Patent No.: US 11,372,616 B2
(45) Date of Patent: Jun. 28, 2022

(54) PORTABLE STREAMING AUDIO PLAYER

(71) Applicant: Ellodee Inc., Austin, TX (US)

(72) Inventors: William Andrew Liddell, Austin, TX (US); Julie Urice Liddell, Austin, TX (US)

(73) Assignee: ELLODEE INC., Austin, TX (US)

( * ) Notice: Subject to any disclaimer, the term of this patent is extended or adjusted under 35 U.S.C. 154(b) by 0 days.

(21) Appl. No.: 17/250,138

(22) PCT Filed: Jun. 4, 2019

(86) PCT No.: PCT/US2019/035383
§ 371 (c)(1),
(2) Date: Dec. 4, 2020

(87) PCT Pub. No.: WO2019/236576
PCT Pub. Date: Dec. 12, 2019

(65) Prior Publication Data
US 2021/0240436 A1    Aug. 5, 2021

Related U.S. Application Data

(60) Provisional application No. 62/681,062, filed on Jun. 5, 2018.

(51) Int. Cl.
| | | |
|---|---|---|
| *H04R 1/02* | (2006.01) | |
| *G06F 3/16* | (2006.01) | |
| *G06F 3/02* | (2006.01) | |
| *G06F 3/0362* | (2013.01) | |
| *G06F 3/044* | (2006.01) | |
| *H02J 7/00* | (2006.01) | |
| *H04R 3/00* | (2006.01) | |
| *H04R 9/06* | (2006.01) | |

(52) U.S. Cl.
CPC ............... *G06F 3/165* (2013.01); *G06F 3/02* (2013.01); *G06F 3/0362* (2013.01); *G06F 3/044* (2013.01); *H02J 7/0044* (2013.01); *H04R 1/023* (2013.01); *H04R 1/025* (2013.01); *H04R 3/00* (2013.01); *H04R 2420/07* (2013.01)

(58) Field of Classification Search
CPC .......... G06F 3/165; G06F 3/02; G06F 3/0362; G06F 3/044; H02J 7/0044; H04R 1/023; H04R 1/025; H04R 3/00; H04R 2420/07
USPC .................................................. 381/334, 333
See application file for complete search history.

(56) References Cited

U.S. PATENT DOCUMENTS 9,659,577 B1    5/2017   Langhammer
2005/0124387 A1*  6/2005   Ribeiro ................. G06F 1/1688
                                                             455/566

(Continued)

OTHER PUBLICATIONS

"FH-X830BHS, FH-X730BS, FH-X731BT User Manual by Pioneer" (Year: 2015).*

(Continued)

*Primary Examiner* — Ammar T Hamid
(74) *Attorney, Agent, or Firm* — Norton Rose Fulbright US LLP

(57) ABSTRACT

A portable streaming audio player and methods of using and programming the portable streaming audio player are described. The portable streaming audio player can include an interface panel that includes one or more assignable selection buttons to which streaming audio content can be assigned.

19 Claims, 25 Drawing Sheets

(56) References Cited

U.S. PATENT DOCUMENTS

| | | |
|---|---|---|
| 2014/0193017 A1 | 7/2014 | Fortin |
| 2015/0138096 A1 | 5/2015 | Peterson et al. |
| 2016/0345086 A1 | 11/2016 | Chamberlin et al. |

OTHER PUBLICATIONS

FH-X830BHCS, FH-X730BS, FH-X731BT Owner's Manual (Pioneer). Retrieved Aug. 5, 2019, from https://www.pioneerelectronics.com/StaticFiles/Manuals/Car/FH-X731BT_OwnersManual051816.pdf.

International Preliminary Report on Patentability Issued in Corresponding PCT Patent Application No. PCT/US2019/035383, dated Dec. 8, 2020.

International Search Report and Written Opinion Issued in Corresponding PCT Patent Application No. PCT/US2019/035383, dated Aug. 28, 2019.

\* cited by examiner

PORTABLE STREAMING AUDIO PLAYER

CROSS REFERENCE TO RELATED APPLICATION

This application is a national phase under 35 U.S.C. § 371 of International Application No. PCT/US2019/035383, filed Jun. 4, 2019, which claims the benefit of priority to U.S. Provisional Patent Application No. 62/681,062, filed Jun. 5, 2018, the entire contents of each of which are incorporated herein by reference in their entirety.

BACKGROUND OF THE INVENTION

A. Field of the Invention

A portable audio player compatible with a music streaming service is provided, along with methods for assigning a streaming audio source to one or more assignable buttons of the audio player and methods of using the audio player.

B. Description of Related Art

The widespread adoption of smartphones and tablets and improvements in data transfer speeds has led to a boom in streaming audio. Now, anyone with a smartphone or tablet can listen to their favorite audio content any time, on demand.

Even as streaming technology has made possible new forms of audio entertainment, such as podcasts, and dramatically increased the popularity of existing forms, such as audiobooks, it has led to a sharp decline in physical media, such as CDs, through which music was traditionally consumed. Increasingly, the only way to access on-demand audio content is through a smartphone or tablet.

This trend prevents those without a smartphone or tablet, or without on-demand access to one, from enjoying music and stories. For example, most children in the United States do not receive their first smartphone or tablet until age 10, and there is a growing consensus among health professionals that children should not get their own screen until they are at least 14. These are prime developmental years during which children should be free to listen to music and stories independently, but because they do not have direct access to a screen, children are left overly dependent on their parents. In addition, because many streaming services serve their audio content algorithmically, children are often exposed to content that their parents disapprove of.

SUMMARY OF THE INVENTION

A discovery has been made that offers a solution to many of the problems of access to and control of streaming audio content. The solution is premised on allowing selection and assignment, via a program or website for a smartphone, tablet, or PC, of certain audio content from any streaming service to a portable streaming audio player. After the audio content is assigned to the portable streaming audio player, it may then be accessed directly from the player. While the disclosed embodiments concern streaming audio content, a person of ordinary skill in the art will understand that the disclosed methods and apparatuses may be used with streaming audiovisual or visual media.

In one aspect of the present invention, a portable streaming audio player is disclosed, comprising a body comprising: an interface panel comprising a selection wheel comprising a first assignable selection button; a display; a control knob; and a first music control button; a boot comprising a notch, a recessed portion, and a first charging contact disposed within the recessed portion; a speaker driver attached to and supported by the boot; a speaker grille attached to the interface panel and the boot and surrounding the speaker driver; a processor; a wireless card; and a computer readable storage media.

In certain embodiments of the portable streaming audio player, the body further comprises a proximity sensor.

In certain other embodiments of the portable streaming audio player, the body further comprises a capacitive touch mat, the capacitive touch mat comprising a first region corresponding to the first assignable selection button, a second region corresponding to the first music control button, and a third region corresponding to the wheel select button.

In still other embodiments of the portable streaming audio player, the body further comprises a first LED corresponding to the first assignable selection button.

In various embodiments, the selection wheel of the portable streaming audio player further comprises a second assignable selection button, a third assignable selection button, a fourth assignable selection button, a fifth assignable selection button, and a sixth assignable selection button, and the body further comprises a first LED corresponding to the first assignable selection button, a second LED corresponding to the second assignable selection button, a third LED corresponding to the third assignable selection button, a fourth LED corresponding to the fourth assignable selection button, a fifth LED corresponding to the fifth assignable selection button, and a sixth LED corresponding to the sixth assignable selection button.

In certain embodiments, the interface panel of the portable streaming audio player further comprises a first wheel select button; a second wheel select button, a third wheel select button, and a fourth wheel select button. In related embodiments, the body further comprises a seventh LED corresponding to the first wheel select button, an eighth LED corresponding to the second wheel select button, a ninth LED corresponding to the third wheel select button, and a tenth LED corresponding to the fourth wheel select button.

In certain embodiments, the interface panel of the portable streaming audio player further comprises a second music control button and a third music control button. In related embodiments, the body further comprises an eleventh LED corresponding to the first music control button, a twelfth LED corresponding to the second music control button, and a thirteenth LED corresponding to the third music control button.

In certain embodiments, the portable streaming audio player further comprises a handle rotatably affixed to the body.

Certain specific embodiments disclose a portable streaming audio player comprising a body comprising an interface panel comprising a selection wheel comprising a first assignable selection button; a second assignable selection button; a third assignable selection button; a fourth assignable selection button; a fifth assignable selection button; and a sixth assignable selection button; a display; a control knob; music control buttons comprising a back button; a play/pause button; and a forward button; wheel select buttons comprising a first wheel select button; a second wheel select button; a third wheel select button; and a fourth wheel select button; a boot comprising a notch, a recessed portion, and a first charging contact disposed within the recessed portion; a speaker driver attached to and supported by the boot; a speaker grille attached to the interface panel and the boot and surrounding the speaker driver; a proximity sensor; a processor; a wireless card; a computer readable storage media; a first LED corresponding to the first assignable selection button; a second LED corresponding to the second assignable selection button; a third LED corresponding to the third assignable selection button; a fourth LED corresponding to the fourth assignable selection button; a fifth LED corresponding to the fifth assignable selection button; a sixth LED corresponding to the sixth assignable selection button; a seventh LED corresponding to the back button; an eighth LED corresponding to the play/pause button; a ninth LED corresponding to the forward button; a tenth LED corresponding to the first wheel select button; an eleventh LED corresponding to the second wheel select button; a twelfth LED corresponding to the third wheel select button; and a thirteenth LED corresponding to the fourth wheel select button.

In certain embodiments of the portable streaming audio player, each assignable selection button has a first state, a second state, a third state, and a fourth state such that an assignable selection button in its first state is configured to be associated with a first audio file and a first color, an assignable selection button in its second state is configured to be associated with a second audio file and a second color, an assignable selection button in its third state is configured to be associated with a third audio file and a third color, and an assignable selection button in its fourth state is configured to be associated with a fourth audio file and a fourth color.

In various related embodiments, the first wheel select button is configured to be associated with the first assignable selection button in its first state, the second assignable selection button in its first state, the third assignable selection button in its first state, the fourth assignable selection button in its first state, the fifth assignable selection button in its first state, and the sixth assignable selection button in its first state; the second wheel select button is configured to be associated with the first assignable selection button in its second state, the second assignable selection button in its second state, the third assignable selection button in its second state, the fourth assignable selection button in its second state, the fifth assignable selection button in its second state, and the sixth assignable selection button in its second state; the third wheel select button is configured to be associated with the first assignable selection button in its third state, the second assignable selection button in its third state, the third assignable selection button in its third state, the fourth assignable selection button in its third state, the fifth assignable selection button in its third state, and the sixth assignable selection button in its third state; and the fourth wheel select button is configured to be associated with the first assignable selection button in its fourth state, the second assignable selection button in its fourth state, the third assignable selection button in its fourth state, the fourth assignable selection button in its fourth state, the fifth assignable selection button in its fourth state, and the sixth assignable selection button in its fourth state.

In certain other related embodiments, the assignable selection buttons in their respective first states are configured to display a first color palette, the assignable selection buttons in their respective second states are configured to display a second color palette, the assignable selection buttons in their respective third states are configured to display a third color palette, and the assignable selection buttons in their respective fourth states are configured to display a fourth color palette, where each of the first, second, third, and fourth color palettes is distinct from the other color palettes.

In certain embodiments, the portable streaming audio player is further configured such that upon detecting the presence of a user, the selection wheel and the display illuminate. In other embodiments, the portable streaming audio player is configured such that after an elapsed time during which audio is playing and no user input is received, the selection wheel and the display turn off. In still other embodiments, the portable streaming audio player is further configured such that after an elapsed time during which audio is not playing and no input is received, the portable streaming audio player enters a sleep state.

In various embodiments, the portable streaming audio player is configured to be associated with one or more streaming services.

Additional embodiments are directed to a kit comprising a charging base any of the embodiments of the portable streaming audio player described herein, wherein the recessed portion of the boot of the portable streaming audio player is substantially a volumetric negative of the charging base.

Still other embodiments are directed to an interface panel, which may be used for streaming audio, visual, or audiovisual content. In such embodiments, the interface panel comprises a selection wheel comprising a first assignable selection button; a second assignable selection button; a third assignable selection button; a fourth assignable selection button; a fifth assignable selection button; and a sixth assignable selection button; a display; a control knob; music control buttons comprising a back button; a play/pause button; and a forward button; and wheel select buttons comprising a first wheel select button; a second wheel select button; a third wheel select button; and a fourth wheel select button.

The use of the words "a" or "an" when used in conjunction with any of the terms "comprising," "including," "containing," or "having," in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "substantially" and its variations are defined to include the ranges within 10%, within 5%, within 1%, or within 0.5%.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

FIGS. 1-24 are to scale. While the invention is susceptible to various modifications and alternative forms, specific embodiments thereof are shown by way of example in the drawings and may herein be described in detail.

DETAILED DESCRIPTION OF THE INVENTION

Figure 1:
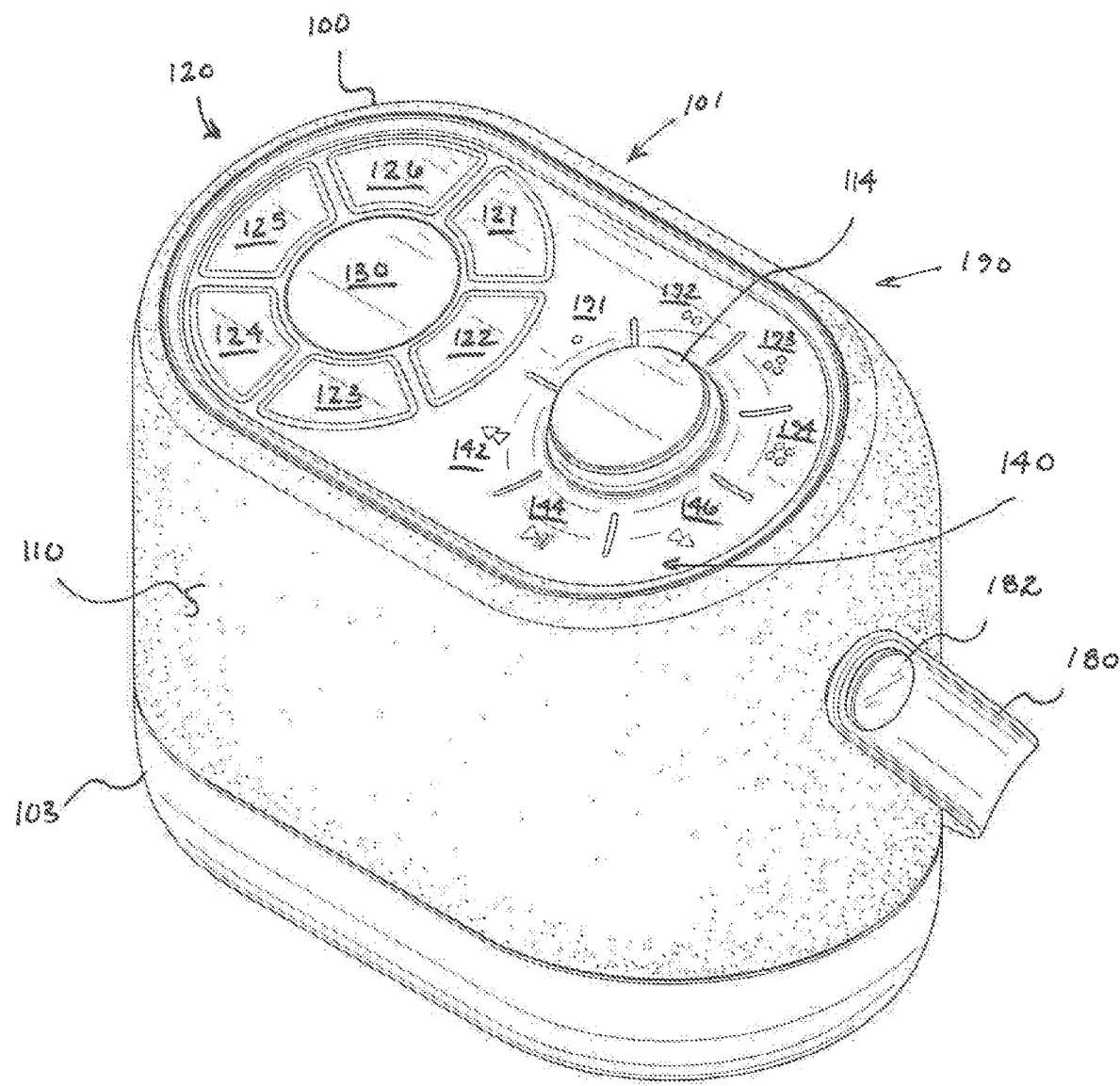
FIG. 1 is a top perspective view of embodiments of an audio player showing a rotatable handle in a first position.

Non-limiting aspects of the present invention are discussed in detail below in the following sections with reference to the Figures.

A. Portable Streaming Audio Player

In the embodiments shown in FIGS. 1-16, player 10 comprises a body 100 comprising an interface panel 101, speaker grille 110, boot 103, handle 180, and handle bolts 182.

FIGS. 1-8 depict embodiments of a portable streaming audio player 10 with handle 180 in a first position. FIGS. 9-16 depict embodiments of portable streaming audio player 10 with handle 180 in a second position.

Body 100 comprises at least one speaker driver 108. In certain embodiments, one, two, three, four, or more speaker drivers 108 may be provided. In certain embodiments, speaker driver 108 is attached to and supported by boot 103. In other embodiments, speaker driver 108 is attached to and supported by the underside of interface panel 101. In still other embodiments, speaker driver 108 is attached to and supported by both boot 103 and interface panel 101.

Speaker grille 110 conceals the at least one speaker driver 108. In certain embodiments, speaker grille 110 is removable. In such embodiments, speaker cover 110 may be provided with tabs, magnets, screws, bolts, zippers, hook and loop fasteners, elastic loops, or other means of temporarily fastening speaker grille 110 to body 100. In other embodiments, speaker grille 110 is integral with body 100. In certain embodiments, speaker grille 110 comprises a knitted textile. In certain specific embodiments, the knitted textile is a plain fabric that is attached to the body 100 by wrapping it around body 100 and laser welding, gluing, or otherwise attaching it to body 100 and to itself, such that there is a vertical seam. In other specific embodiments, the knitted textile is a tubular fabric that is attached to body 100 laser welding, gluing, or otherwise attaching it to body 100 such that there is no vertical seam. In preferred embodiments, speaker grill is acoustically transparent, or substantially acoustically transparent.

In the embodiments shown in FIGS. 1-16, handle 180 is rotatably affixed to body 180 via handle bolts 182. In certain embodiments, handle 180 is freely rotatable about handle bolts 182. In other embodiments, handle 180 is rotatable only from a first position (e.g., as depicted in FIGS. 1-8) to a second position (e.g., as depicted in FIGS. 9-16). In still other embodiments, handle 180 may be provided with a damper(s), spring(s), or other retention mechanism such that the handle is held in place in any intermediate position between the first position and the second position.

In the embodiments shown, handle 180 may be formed from molded plastic, rubber, or formed wood. In still other embodiments, handle 180 may be formed from any suitable material, including nylon, silicon, leather, vegetable leather, or microsuede. In certain embodiments, handle 180 and handle bolts 182 are removable.

In the embodiments shown in FIGS. 1-16, interface panel 101 comprises control knob 114, selection wheel 120, display 130, music control buttons 140, and wheel select buttons 190.

In certain embodiments, control knob 114 is rotatable about and depressible along its central axis. In certain embodiments, control knob 114 may have a limited range of motion such that it is not freely rotatable about its central axis. In still other embodiments, control knob 114 may have articulated stops or positions corresponding to a certain value (e.g., a percentage of volume).

In the embodiments shown in FIGS. 1-16, interface panel 101 comprises a capacitive touch mat 111 with regions of mat 111 corresponding to any one or more of selection wheel 120, display 130, music control buttons 140, and wheel select buttons 190. Certain embodiments may comprise more than one capacitive touch mat 111, with separate capacitive touch mats corresponding to different buttons (e.g., a first capacitive touch mat 111 associated with music control buttons 140, a second capacitive touch mat 111 associated with wheel select buttons 190, and a third capacitive touch mat 111 associated with selection wheel 120). In other embodiments, any one or more of the selection wheel 120, music control buttons 140, and wheel select buttons 190 may be associated with an actuator such that engaging the actuator (e.g., through a button press) causes an action associated with the button to be performed.

Selection wheel 120 comprises at least one assignable selection button. In the present embodiments, selection wheel 120 comprises a first assignable selection button 121, a second assignable selection button 122, a third assignable selection button 123, a fourth assignable selection button 124, a fifth assignable selection button 125, and a sixth assignable selection button 126. In the embodiments depicted in FIGS. 1, 3, 7, 9, 11, and 15, the selection buttons are shaped generally like segments of a ring and are arrayed around a common axis, but a person of ordinary skill in the art would understand that assignable selection buttons may have other shapes and may be arranged in other ways, such as in a row or in a grid. Also in the embodiments depicted in FIGS. 1, 3, 7, 9, 11, and 15 there are six selection buttons, but a person of ordinary skill in the art would understand that there may be fewer or greater assignable selection buttons in other embodiments, including one assignable selection button, two assignable selection buttons, three assignable selection buttons, four assignable selection buttons, assignable selection buttons, five assignable selection buttons, seven assignable selection buttons, eight assignable selection buttons, nine assignable selection buttons, or ten or more assignable selection buttons.

In certain embodiments, the selection buttons may comprise a translucent material or a transparent material. In certain other embodiments, the selection buttons may comprise opaque material with a portion of the opaque material cut out. In some embodiments, the cut out may be in a pattern (e.g., a honeycomb pattern). In certain embodiments, the cut out may be in the shape of a number corresponding to the button (e.g., the shape of a number 1 for button 121, the shape of a number 2 for button 122, the shape of a number 3 for button 123, the shape of a number 4 for button 124, the shape of a number 5 for button 125, and the shape of a number 6 for button 126) or of a shape (e.g., a circle for button 121, a line for button 122, a triangle for button 123, a square for button 124, a pentagon for button 125, and a hexagon for button 126). In still other embodiments, each button may be provided with Braille numbers corresponding to the selection button.

In the embodiments shown in FIGS. 1-16, body 100 further comprises light emitting diodes (LEDs), at least one LED (or group of LEDs) corresponding to each assignable selection button. An LED corresponding to an assignable selection button is configured to illuminate the button to which it corresponds. An LED corresponding to an assignable selection button may be located beneath the button or adjacent to the button. In certain embodiments, light channels, diffusive films, or the like may be used to direct light from an LED to the button to which it corresponds.

In the present embodiments, body 100 comprises first LED 131 corresponding to first assignable selection button 121, second LED 132 corresponding to second assignable selection button 122, third LED 133 corresponding to third assignable selection button 123, fourth LED 134 corresponding to fourth assignable selection button 124, fifth LED 135 corresponding to fifth assignable selection button 125, and sixth LED 136 corresponding to sixth assignable selection button 126. In certain embodiments, the LEDs are dimmable, from 0% brightness to 100% brightness. In certain embodiments, the color of each LED is tunable such that the color of each LED may be changed. In certain embodiments, the default color of each LED corresponds to each selection button. In certain specific embodiments, the default color of first LED 131 is red, second LED 132 is orange, third LED 133 is yellow, fourth LED 134 is green, fifth LED 135 is blue, and sixth LED 136 is purple.

In certain embodiments, the LEDs are configurable to give selection wheel 120 the appearance of having different color palettes (i.e., groups of different colors in a particular order or pattern), which color palettes may be associated with certain groups of content. For example, selection wheel 120 may be configured to display a first color palette associated with a first group of audio content, a second color palette associated with a second group of audio content, a third color palette associated with a third group of audio content, and a fourth color palette associated with a fourth audio group of content.

In certain embodiments, the LEDs corresponding to selection wheel 120 are configured to animate, such as to show a wake or sleep down sequence, or to animate along with the beat of a song. In such embodiments, the brightness and color of each LED may change in time with the beat. Adjacent LEDs may change at different times in some embodiments. In other embodiments, the LEDs change together at the same time. In other embodiments, the LEDs corresponding to the selection buttons are configured to animate randomly, independent of the beat of the song.

In certain embodiments, the LEDs are dimmable, from 0% brightness to 100% brightness. In certain embodiments, the color of each LED is tunable such that the color of each LED may be changed. In other embodiments, another suitable light source other than an LED may provide backlighting to the music control buttons.

In the embodiments illustrated in FIGS. 1-16, display 130 is a digital display. In some embodiments, display 130 may be provided under or adjacent an opening in the interface panel 101. In other embodiments, display 130 may be positioned beneath interface panel 101 such that the display is visible through interface panel 101 when on, but is not visible when display 130 is off. Display 130 may be configured to show information about song, artist, playlist, station, podcast, channel, volume, brightness, shuffle state, repeat state, battery life, status of network connection, or other relevant information. In certain embodiments, display 130 is associated with a capacitive touch sensor and is configured to respond to a user's touch.

In the embodiments illustrated in FIGS. 1-16, audio player 10 further comprises a proximity sensor 138 configured to detect the presence of a user. Proximity sensor may be an optical proximity sensor, capacitive proximity sensor, or any other suitable sensor for detecting the presence of a user. In certain embodiments, upon detection of the presence of a user, display 130 may illuminate and any one or more of the LEDs may illuminate. In certain embodiments, proximity sensor 138 is disposed in interface panel 101, such that it is configured to detect the presence of a user over and above interface panel 101. In other embodiments, proximity sensor 138 is disposed behind speaker grille 110 on the front side of body 100, such that it is configured to detect the presence of a user approaching from the front of audio player 10.

In the illustrated embodiments, music control buttons 140 comprise back button 142, play/pause button 144, and forward button 146. In certain embodiments, the functionality of each music control button differs depending on the type of button press. For example, a user may tap or quickly press back button 142 to jump backward a certain number of seconds (e.g., 5 seconds, 10 seconds, 15 seconds, 20 seconds, 25 seconds, or 30 seconds) in an audio track. If the user holds back button 142 for a longer duration the audio track returns to the beginning of the track. If the user continues to hold back button 142 for an even longer duration, the previous track will cue. Similarly, a user may tap or quickly press forward button 146 to jump forward a certain number of seconds (e.g., 5 seconds, 10 seconds, 15 seconds, 20 seconds, 25 seconds, or 30 seconds) in an audio track. If the user holds forward button 146 for a longer duration the remainder of the track will skip and the next track will cue.

In certain embodiments, audio player 10 may be provided with additional control buttons 140. For example, audio player 10 may have additional control buttons corresponding to fast forward, fast reverse, shuffle mode, repeat mode, or other controls.

In the embodiments illustrated in FIGS. 1-16, the plurality of wheel select buttons 190 comprise a first wheel select button 191, a second wheel select button 192, a third wheel select button 193, and a fourth wheel select button 194. Each wheel select button is associated with a group of audio content and a color palette, such that by pressing each wheel select button, a user may quickly navigate between or browse among audio content.

In the embodiments illustrated in FIGS. 1-16, body 100 further comprises a plurality of light emitting diodes (LEDs), at least one LED (or group of LEDs) corresponding to each music control button 140 and each wheel select button 190. In the present embodiments, body 100 comprises a seventh LED 151 corresponding to back button 142, an eighth LED 152 corresponding to play/pause button 144, a ninth LED 153 corresponding to forward button 146, a tenth LED 154 corresponding to first wheel select button 191, an eleventh LED 155 corresponding to second wheel select button 192, a twelfth LED 156 corresponding to third wheel select button 193, and a thirteenth LED 157 corresponding to fourth wheel select button 194. In still other embodiments, no light source is provided for the music control buttons 140, the wheel select buttons 190, or both, and in such embodiments the buttons may be provided with a glow-in-the-dark material or paint (e.g., Super Luminova), raised features, or other indicators that correspond to the shape of the function icon on each respective button.

In the embodiments illustrated in FIGS. 1-16, control knob 114 is configured to control one or more properties of audio player 10. For example, in certain embodiments, when audio player 10 is in the off state or in sleep state, pressing control knob 114 causes audio player 10 to enter the on state or the awake state. Once in the on state or awake state, control knob 114 is configured such that, by default, turning control knob 114 controls the volume. Additional presses of control knob 114 permit a user to cycle through a menu of properties that may be controlled by turning control knob 114. For example, upon a first press, audio player may enter brightness adjustment mode, such that a brightness icon and meter are shown on display 130, and turning control knob 114 permits a user to control the brightness of the plurality of LEDs backlighting selection wheel 120. Continuing in this example, upon a second press, audio player 10 enters repeat toggle mode, such that an option to toggle between a list repeat state, a track repeat state, and a repeat off state is shown on display 130, and turning control knob 114 permits a user to select among the states. Further continuing in this example, upon a third press, audio player 10 enters shuffle toggle mode, such that an option to toggle between a shuffle on state and a shuffle off state is shown on display 130, and turning control knob 114 permits a user to select between the states. Further continuing in this example, upon a fourth press, audio player 10 enters sync mode, such that a user may simultaneously retrieve content assigned to different assignable selection buttons 120, e.g., the latest episodes of podcasts. Further continuing in this example, upon a fifth press, audio player 10 returns to the default volume control mode. In addition, when in the brightness adjustment mode, repeat toggle mode, shuffle toggle mode, or sync mode, and a user fails to make a selection after a certain amount of time, audio player 10 returns to the default mode where control knob 114 controls the volume. A person of ordinary skill in the art would understand that control knob 114 may be configured to control additional properties of audio player 10 in addition to those described here.

In embodiments illustrated in FIGS. 1-16, audio player 10 is configured to provide user feedback to indicate, for example, when a selection has been successfully made, when a selection has been unsuccessfully made, the status of a selection, or the status of another property of the device.

In certain embodiments, display 130 is a round display configured to selectively show a meter substantially parallel to the outer diameter of display 130 (i.e., a circle or part of a circle), which meter fills and depletes corresponding to the status of a property. In certain embodiments, display 130 may show one or more meters of different colors, weights, arc lengths, or patterns, such that each meter corresponds to a different property. In other embodiments, the meters may have the same color, weight, arc length, or pattern, irrespective of which property the meter is associated with.

For example, in certain embodiments display 130 is configured to selectively show an action meter of 360 degree arc length in a first color, the action meter corresponding to the amount of time a user must hold a button to successfully complete an action. When the user first touches the button, the action meter and an icon corresponding to the action (e.g., play, skip back, skip forward) appears on display 130 and begins to fill at a rate corresponding to the action; if the user ceases to touch a button, the action meter begins to deplete at the same rate it filled; and if a user continues to touch the button for the amount of time necessary to complete the action, the action meter will fill completely, indicating to a user that the action has been successfully performed.

In certain embodiments, display 130 is further configured to selectively show a volume meter of 270 degree arc length in a second color, the volume meter corresponding to the volume of speaker driver 108. When the user first turns control knob 114, the volume meter and a volume icon appears on display 130, and is filled corresponding to the current volume. Turning control knob 114 counterclockwise causes the volume to decrease and the meter to deplete; when the volume is off, the meter is shown fully depleted. Turning control knob 114 clockwise causes volume to increase; when the volume is at its maximum level, the meter is filled. In certain embodiments, the maximum allowable volume of speaker driver 108 may be set using an associated app, and in such embodiments, the maximum allowable volume may be indicated as an icon (e.g., a hash, dot, etc.) placed along the meter at a position less than the 270 degrees of the total arc length.

In certain embodiments, display 130 is further configured to selectively show a brightness meter of 180 degree arc length in a third color, the brightness meter corresponding to the brightness of the LEDs associated with one or more of selection wheel 120, control buttons 140, and wheel select buttons 190. When audio player 10 is in brightness adjustment mode, the brightness meter and a brightness icon appears on display 130. Turning control knob 114 counterclockwise causes the LEDs to dim and the meter to deplete; when the LEDs are off, the brightness meter is fully depleted. Turning control knob 114 clockwise causes the LEDs to brighten; when the LEDs are at maximum brightness, the brightness meter is filled.

In certain embodiments, audio player 10 is configured to provide haptic feedback to indicate, for example, when a selection has been successfully made, when a selection has been unsuccessfully made, the status of an action, or the status of another property of the device. For example, when any of the buttons on selection wheel 120, control buttons 140, or wheel select buttons 190 are pressed and a user successfully completes an action, audio player 10 may vibrate to indicate that the pressing or depressing of the button has registered. In certain embodiments, the vibration may be accomplished through actuating, e.g., a motor, a piston, an eccentric rolling mass actuator, linear resonant accelerator, or piezoelectric actuator, or by emitting a brief deep bass tone from speaker driver 108.

In certain embodiments, audio player 10 is configured to provide auditory feedback to indicate, for example, when a selection has been successfully made, when a selection has been unsuccessfully made, the status of an action, or the status of another property of the device. For example, when any of the buttons on selection wheel 120, control buttons 140, or wheel select buttons 190 are pressed and a user successfully completes an action, audio player 10 may emit a tone, such as a chime, whistle, ring, buzz, or ding corresponding to the action.

In the embodiments illustrated in FIGS. 1-16, audio player 10 comprises a processor 170, a wireless card 172, and computer readable storage media 174. In certain embodiments, audio player 10 includes a wireless card that complies with IEEE 802.15 standards and the standards of related task groups and one or more subsequent revisions. In certain embodiments, audio player 10 includes a wireless card that complies with IEEE 802.11 standards and one or more subsequent revisions. In certain embodiments, audio player 10 may be configured for mesh networking, such that a first audio player may create a mesh network which a second audio player may join. Specifically in certain embodiments, audio player 10 is configured to access a W-F network. In other specific embodiments, audio player 10 is configured to access a cellular network. In still other embodiments, audio player 10 is configured to be Bluetooth compatible.

In the embodiments illustrated in FIGS. 1-16, body 100 comprises a battery 178. In certain embodiments, battery 178 is a rechargeable battery, such as a lithium ion battery. In such embodiments, rechargeable battery is not typically removable, or if removable may be removed only by taking apart body 100. In other embodiments, body 100 comprises more than one battery 178.

In certain embodiments, battery 178 is a removable, disposable battery, such as a size AA, size C, or size D battery. In embodiments comprising a removable, disposable battery, body 100 or recessed portion 107 is provided with a door covering the battery chamber.

In other embodiments, body 100 comprises a power cord. In certain specific embodiments, body 100 comprise an integrated power cord wrapped around a spring loaded spool, such that the power cord may be stored within body 100.

Figure 2:
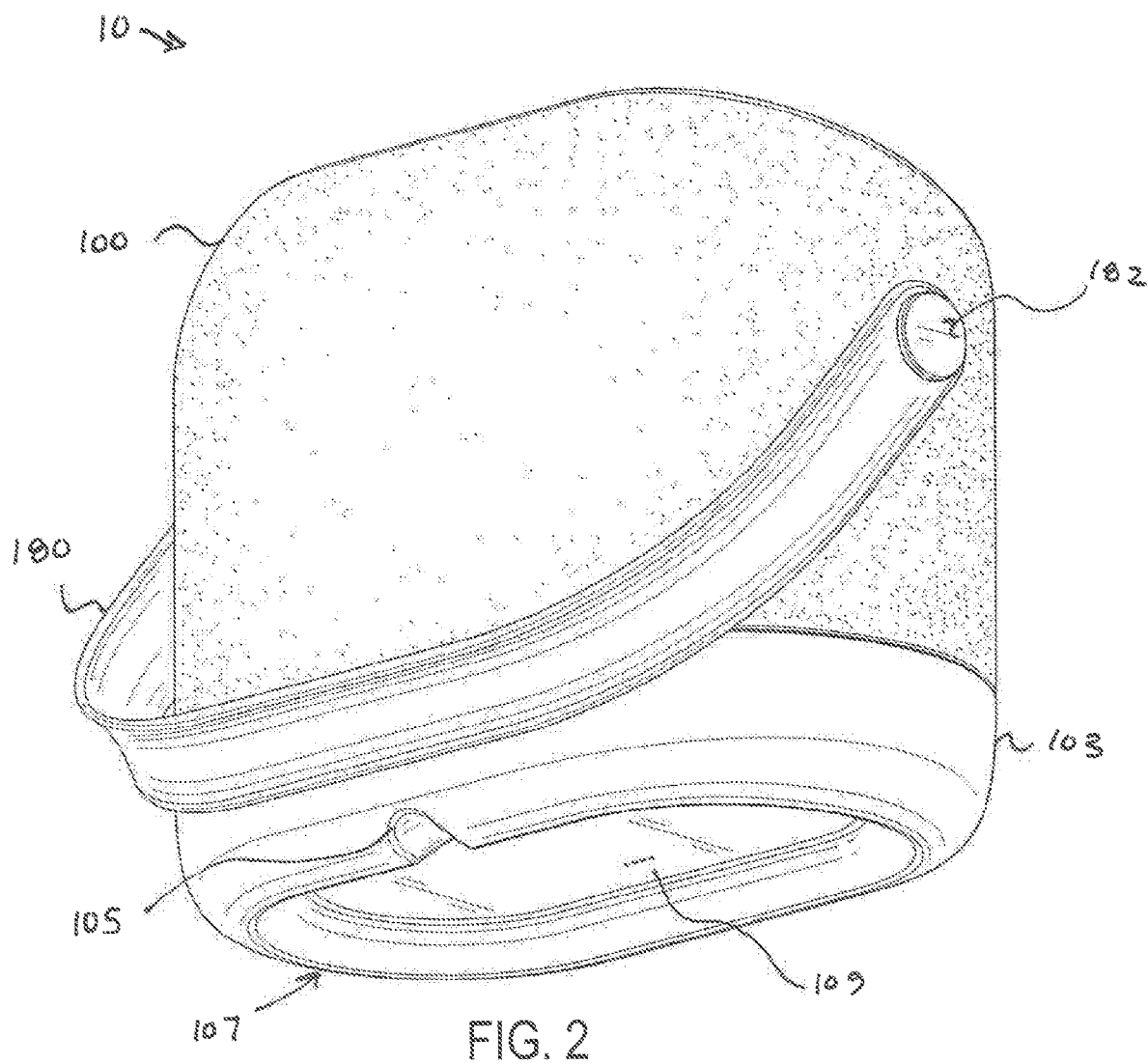
FIG. 2 is a bottom perspective view of embodiments of an audio player showing a rotatable handle in a first position.
Figure 3:
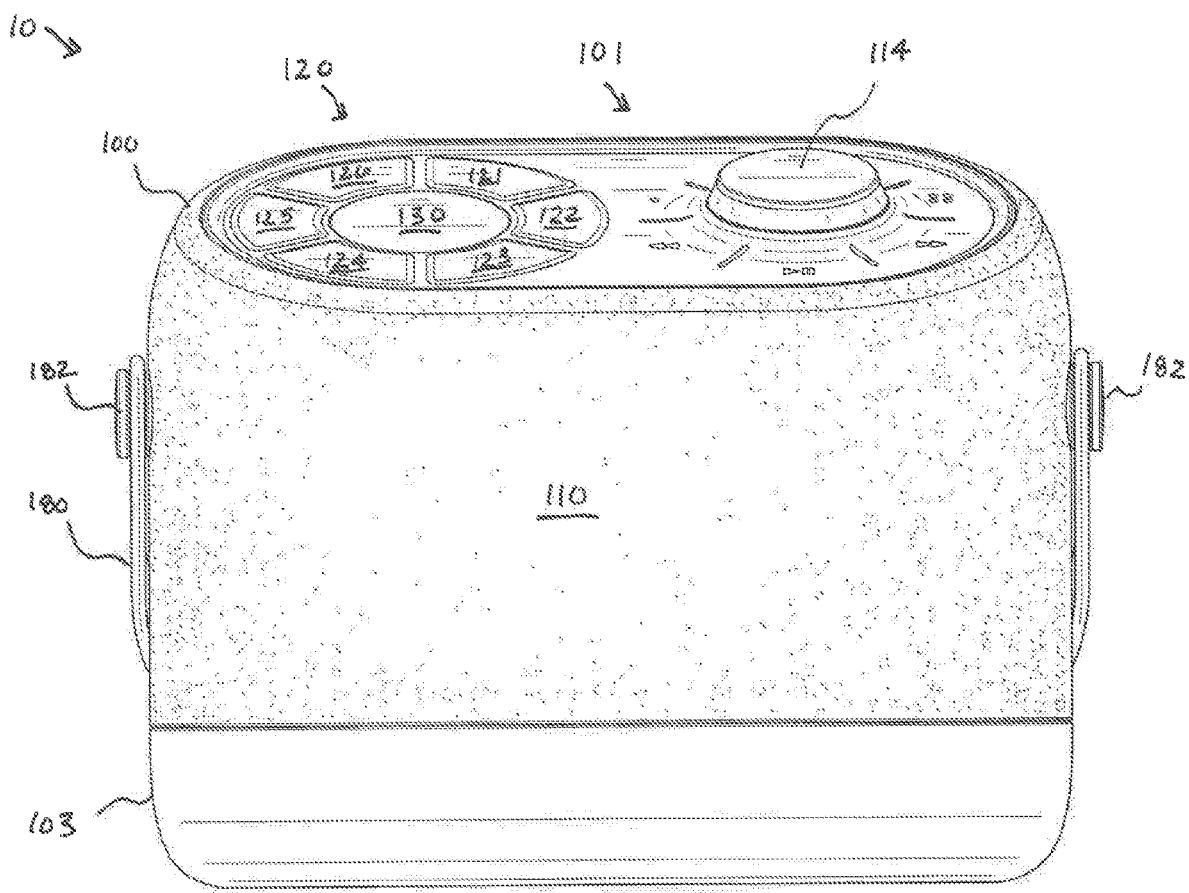
FIG. 3 is a front view of embodiments of an audio player showing a rotatable handle in a first position.
Figure 4:
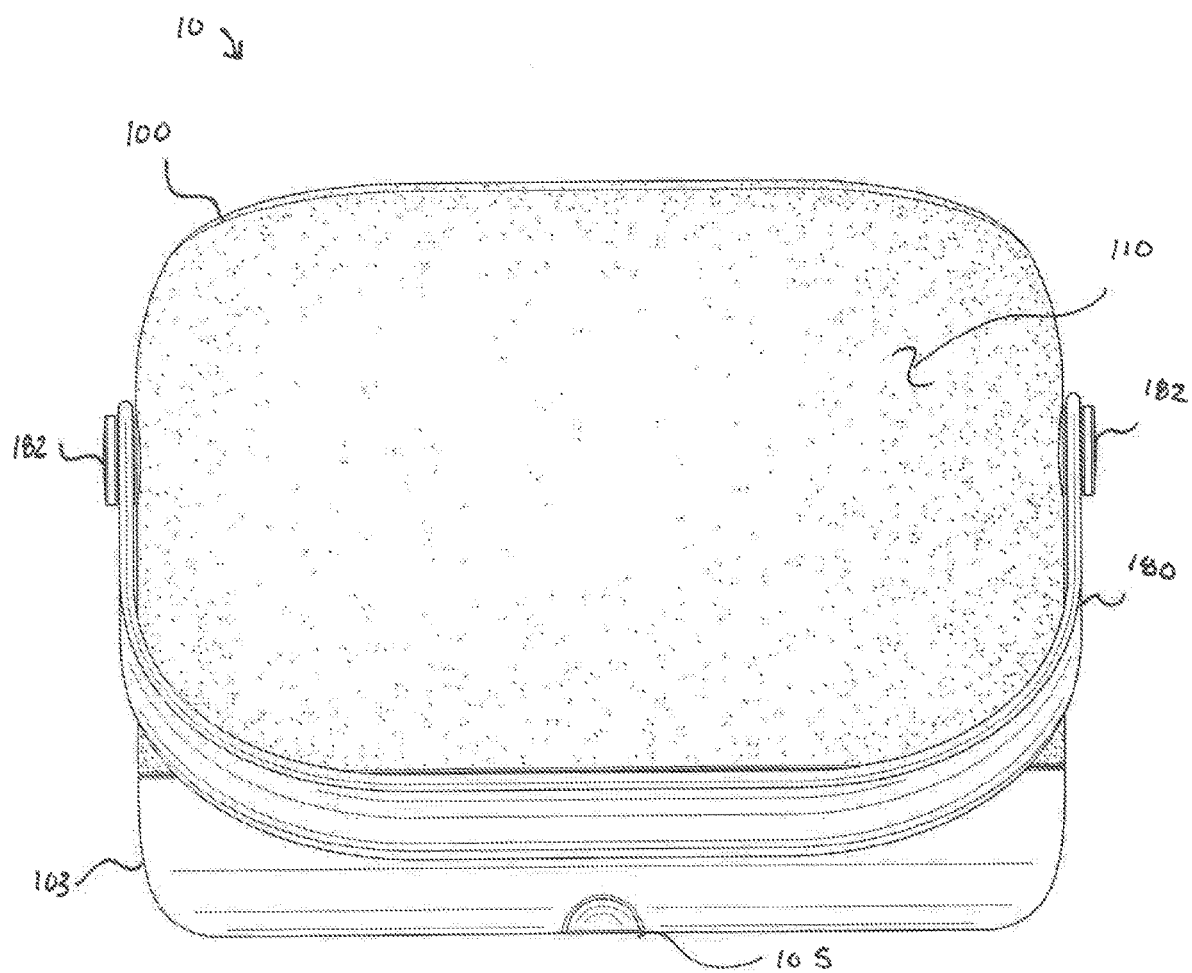
FIG. 4 is a back view of embodiments of an audio player showing a rotatable handle in a first position.
Figure 5:
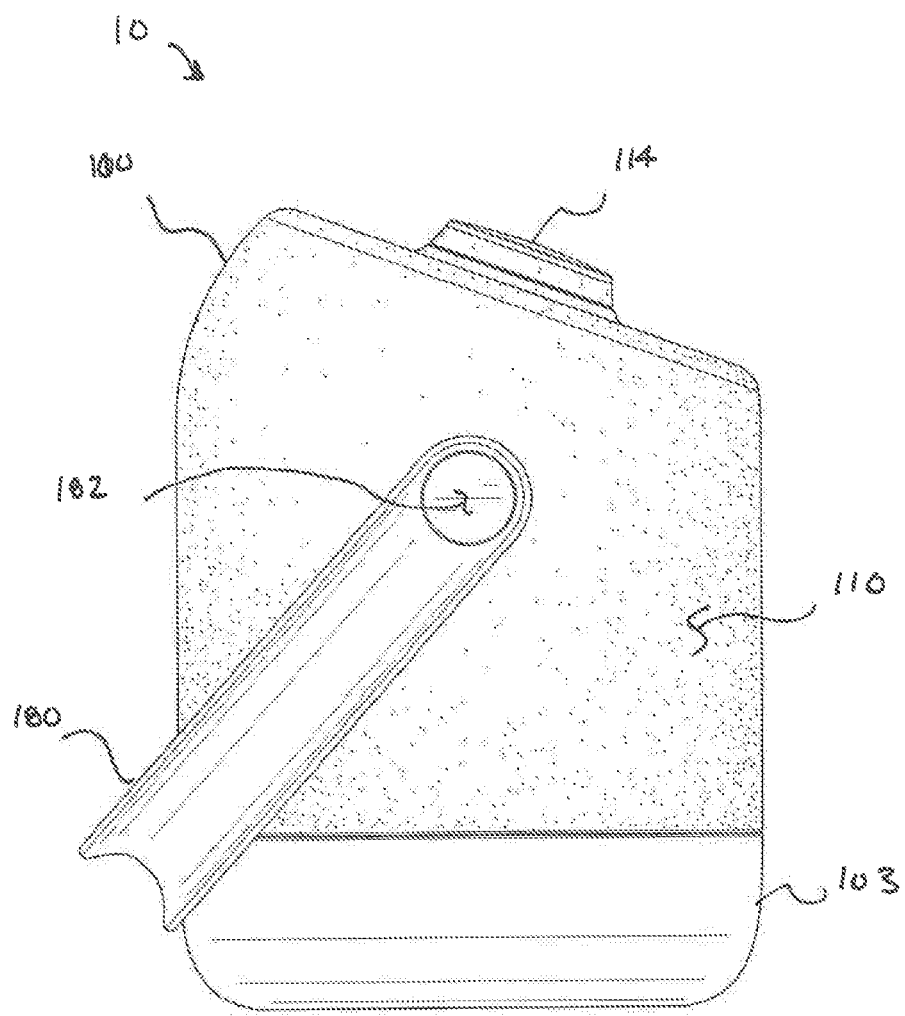
FIG. 5 is a right side view of embodiments of an audio player showing a rotatable handle in a first position.
Figure 6:
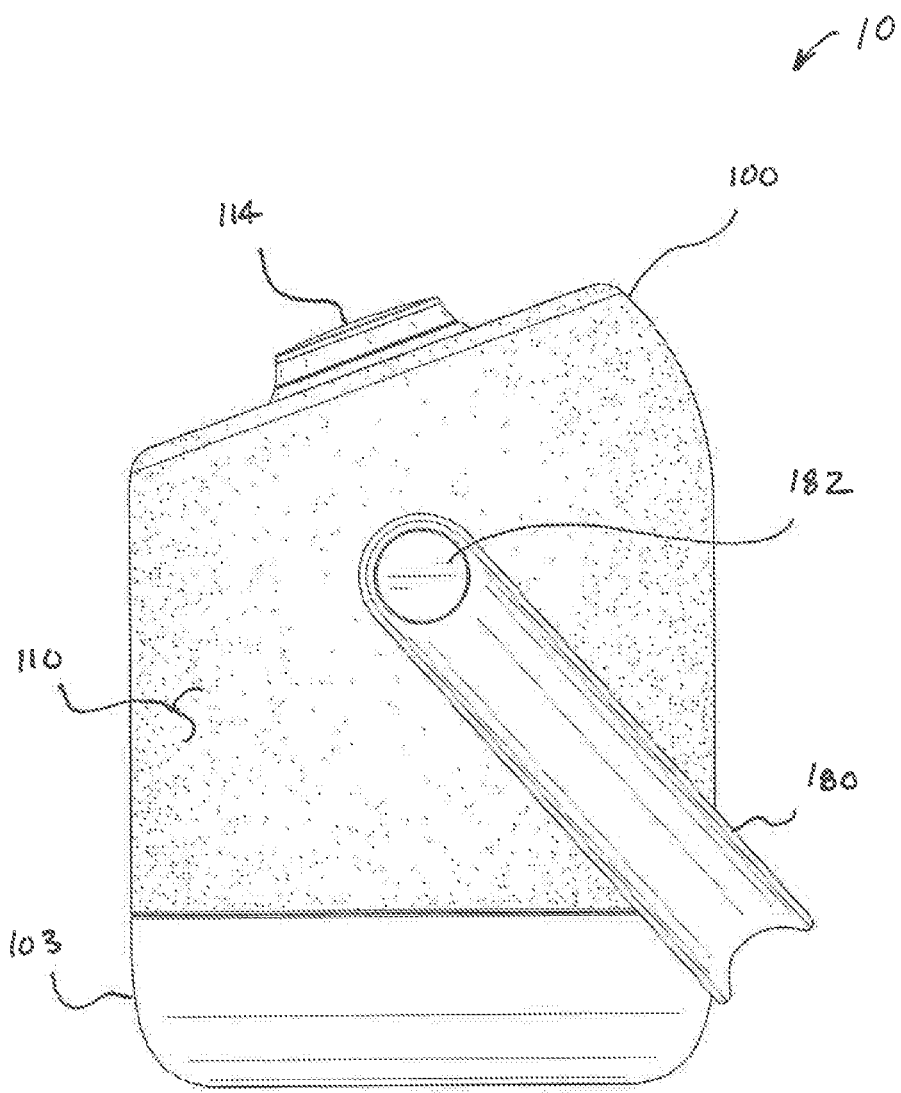
FIG. 6 is a left side view of embodiments of an audio player showing a rotatable handle in a first position.
Figure 7:
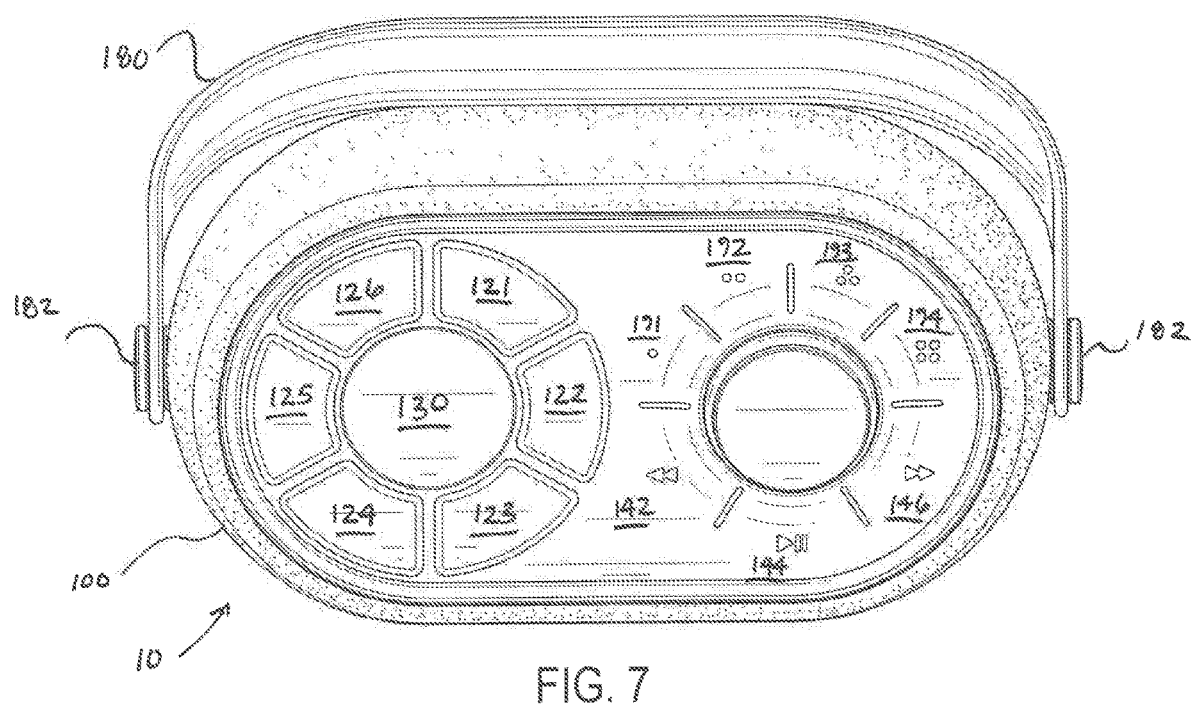
FIG. 7 is a top view of embodiments of an audio player showing a rotatable handle in a first position.
Figure 8:
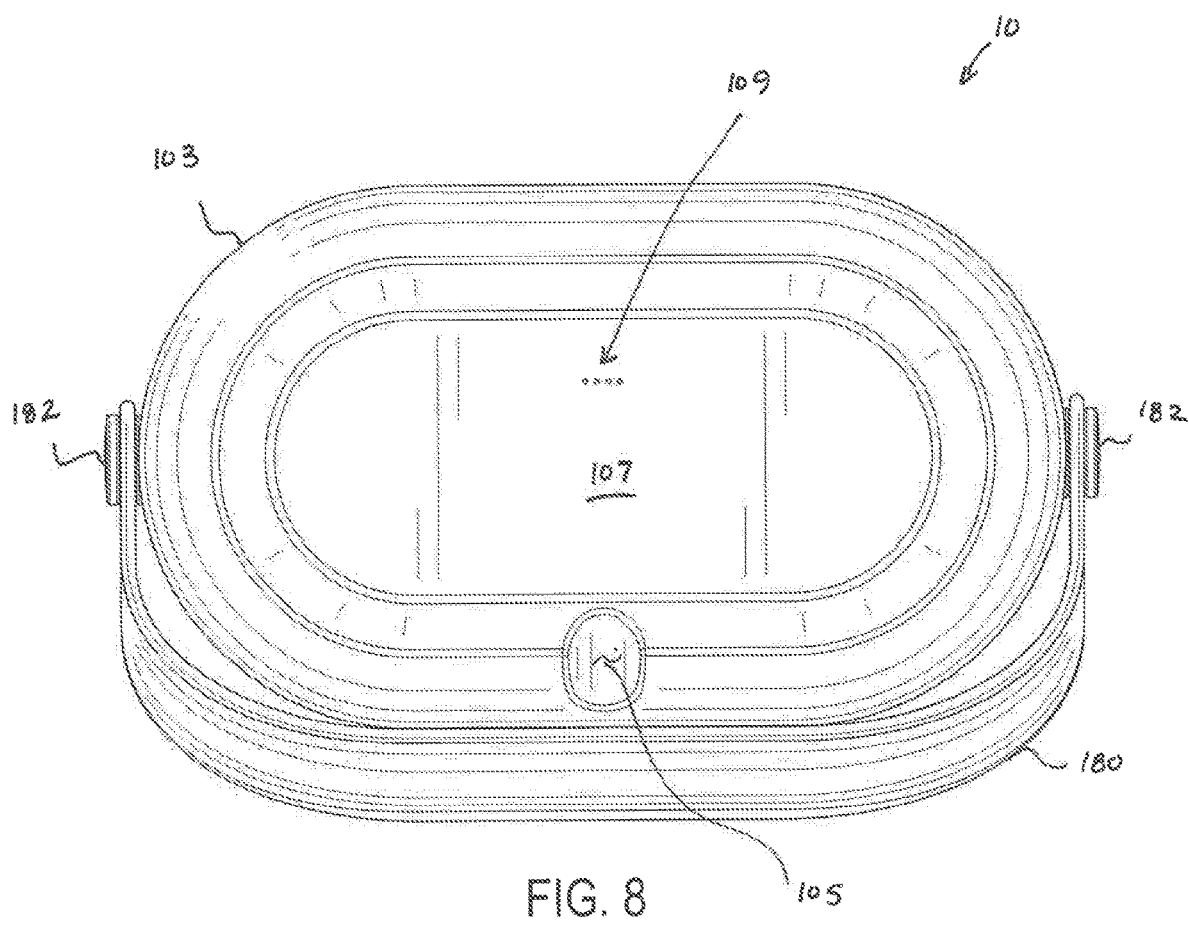
FIG. 8 is a bottom view of embodiments of an audio player showing a rotatable handle in a first position.
Figure 9:
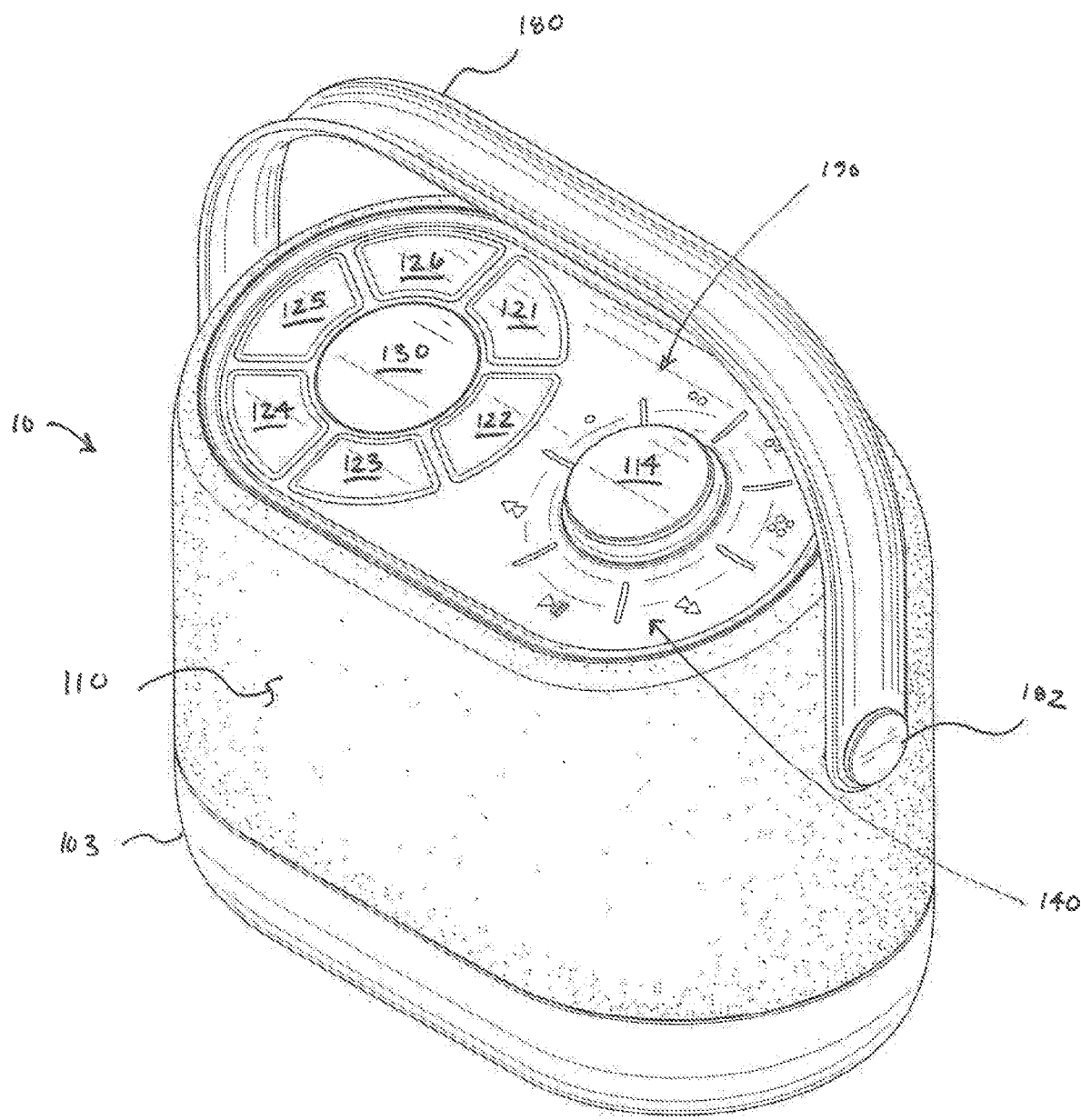
FIG. 9 is a top perspective view of embodiments of an audio player showing a rotatable handle in a second position.
Figure 10:
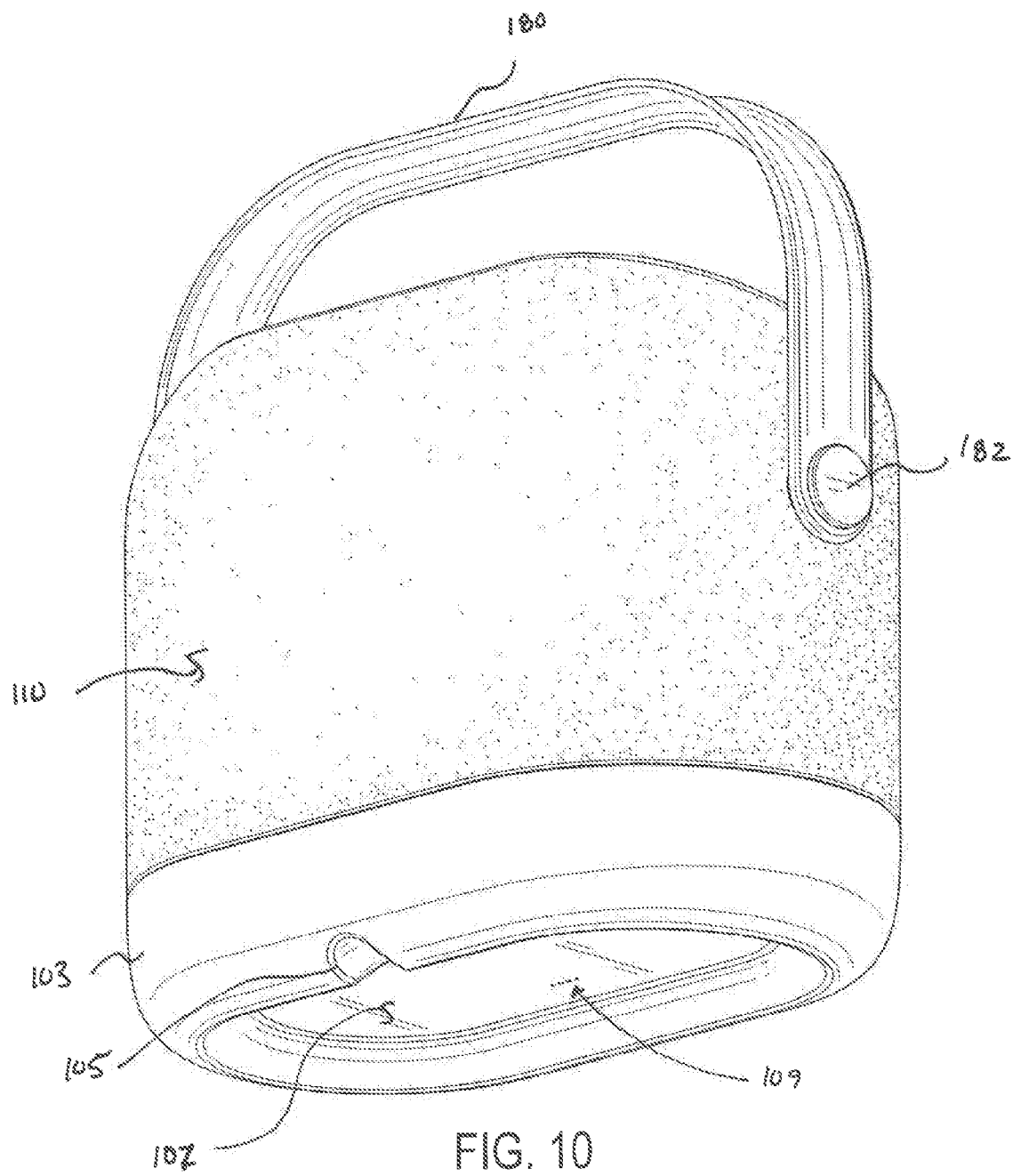
FIG. 10 is a bottom perspective view of embodiments of an audio player showing a rotatable handle in a second position.
Figure 11:
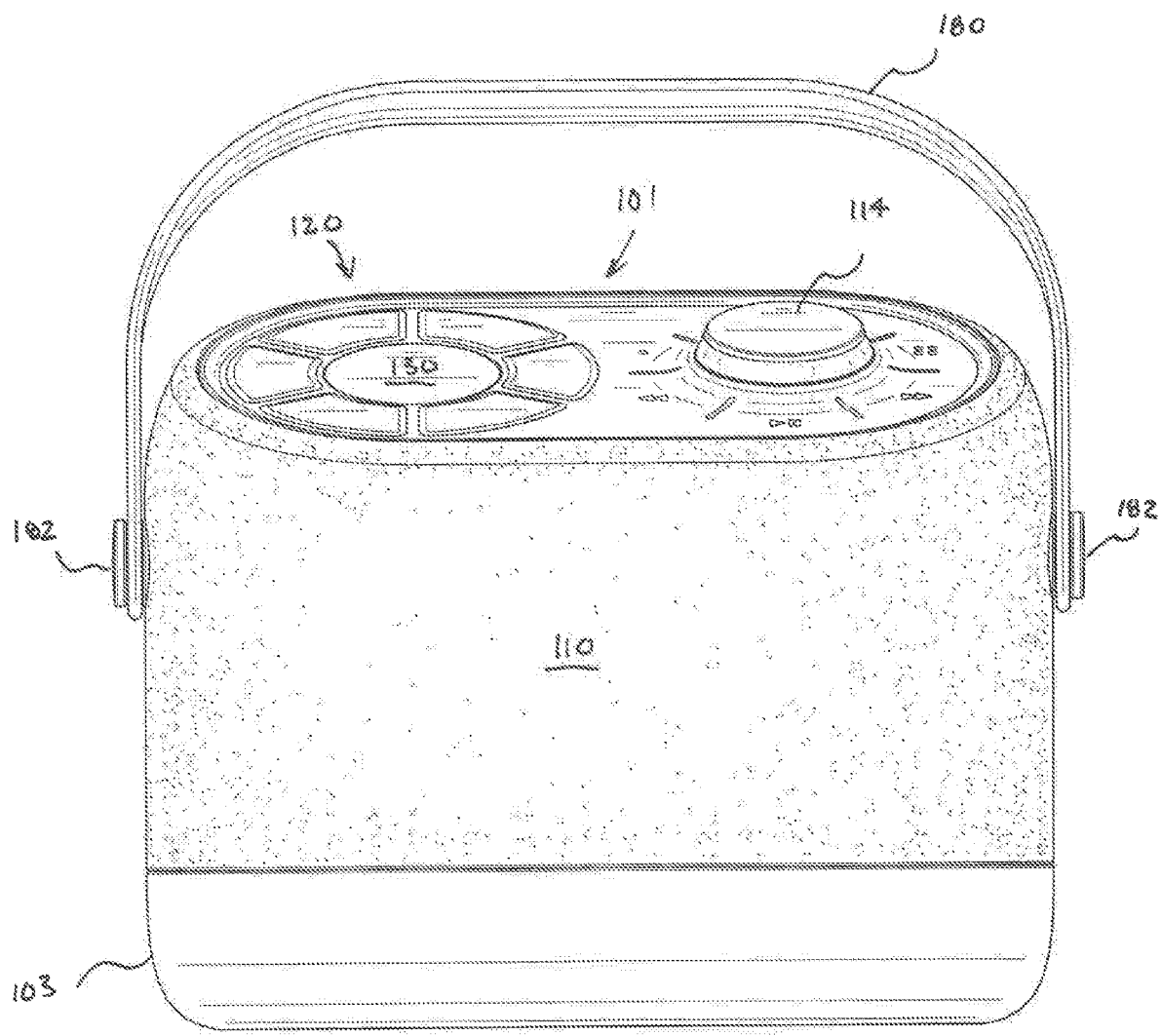
FIG. 11 is a front view of embodiments of an audio player showing a rotatable handle in a second position.
Figure 12:
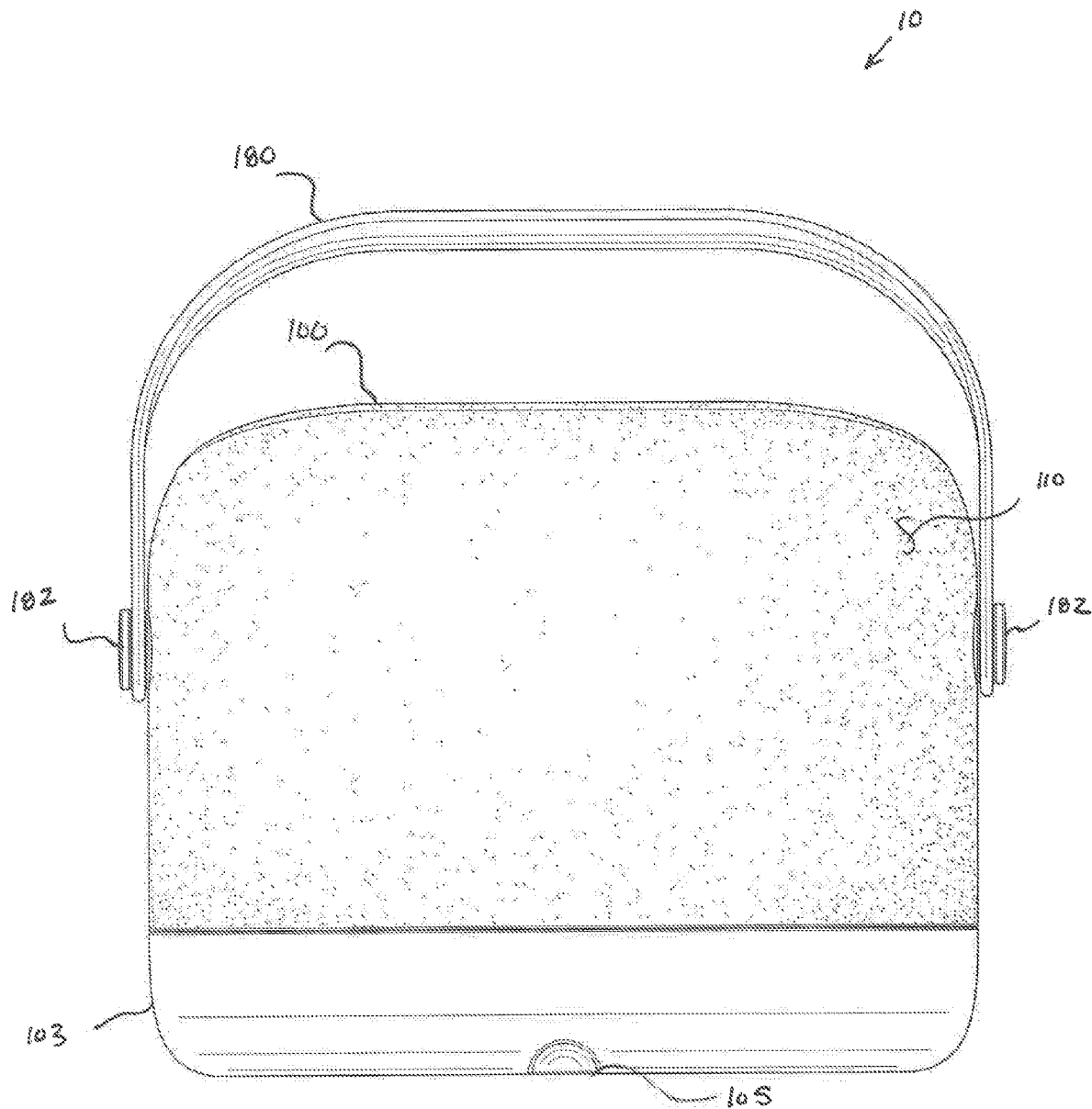
FIG. 12 is a back view of embodiments of an audio player showing a rotatable handle in a second position.
Figure 13:
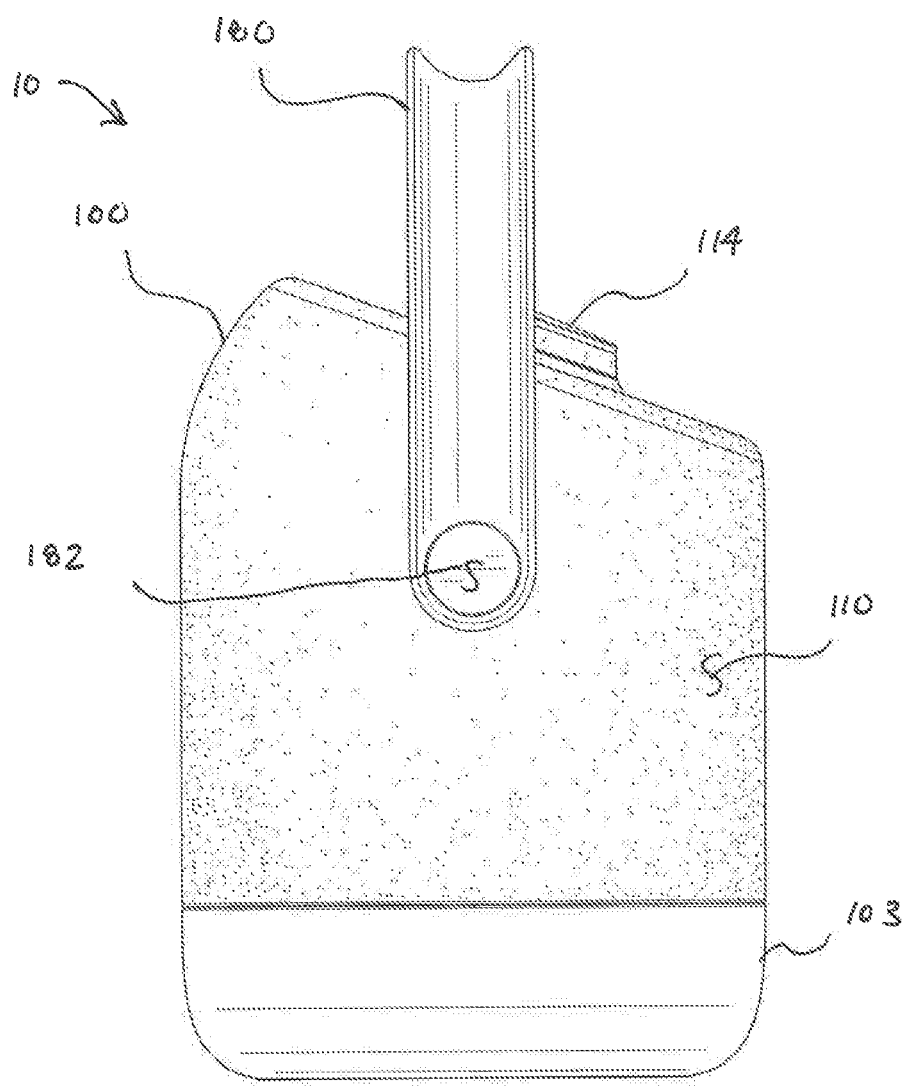
FIG. 13 is a right side view of embodiments of an audio player showing a rotatable handle in a second position.
Figure 14:
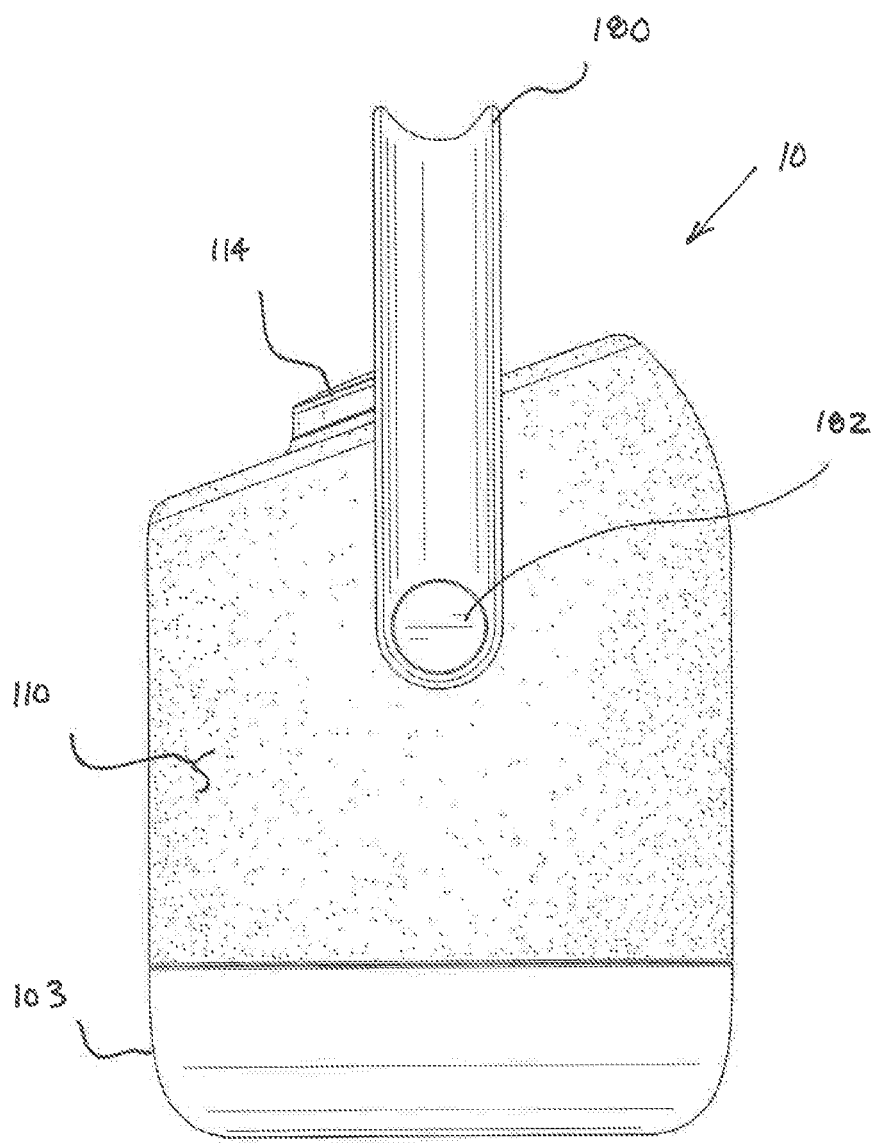
FIG. 14 is a left side view of embodiments of an audio player showing a rotatable handle in a second position.
Figure 15:
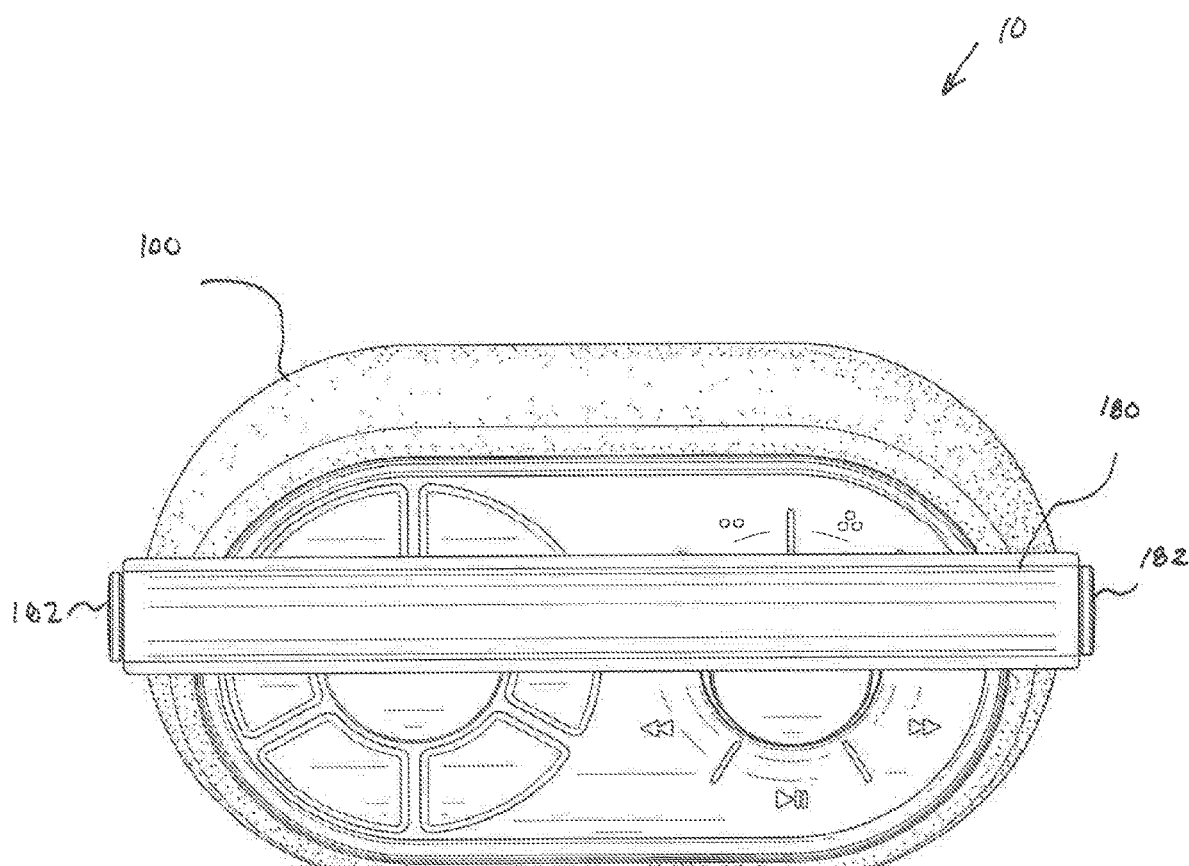
FIG. 15 is a top view of embodiments of an audio player showing a rotatable handle in a second position.
Figure 16:
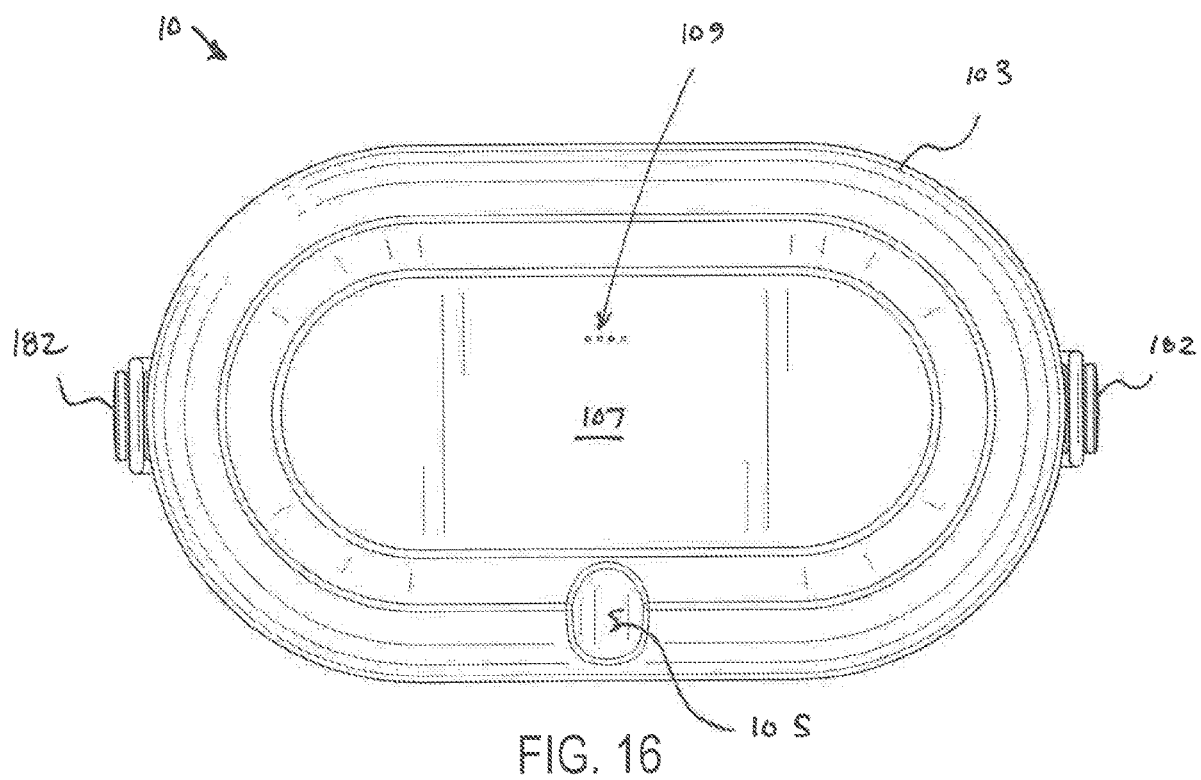
FIG. 16 is a bottom view of embodiments of an audio player showing a rotatable handle in a second position.
Figure 17:
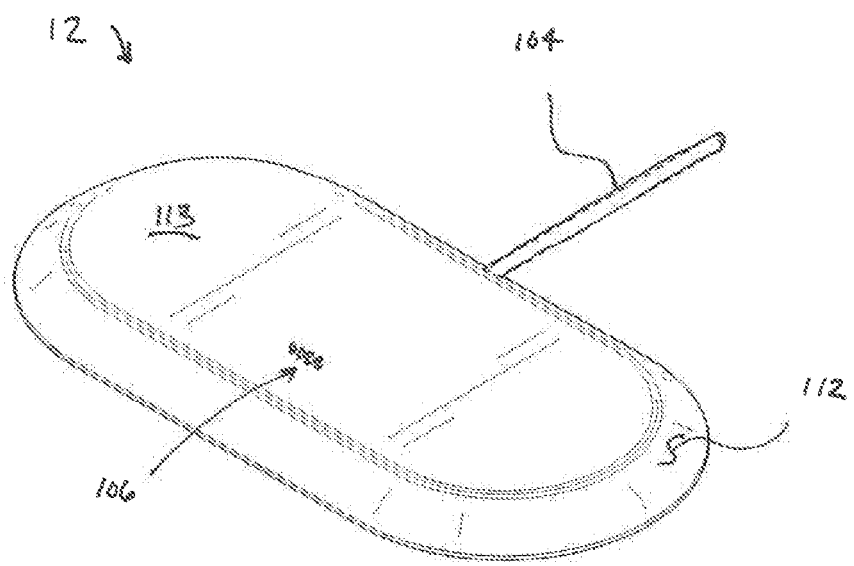
FIG. 17 is a top perspective view of a charging plate compatible with any of the embodiments of the audio player shown in FIGS. 1-16.
Figure 18:
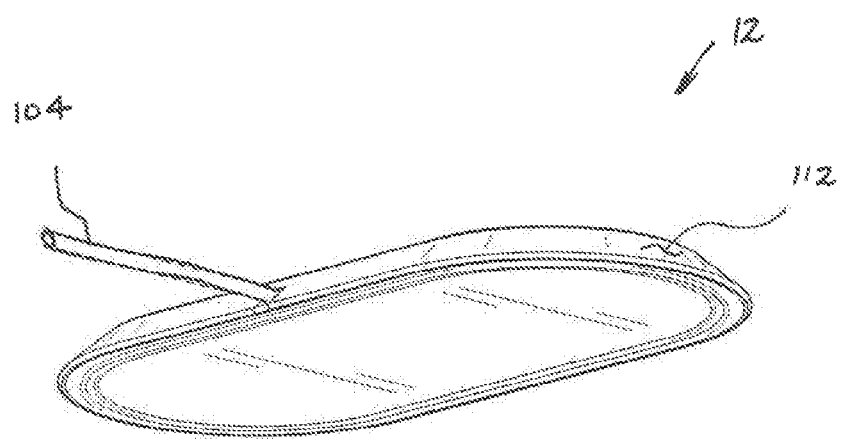
FIG. 18 is a bottom perspective view of a charging plate compatible with any of the embodiments of the audio player shown in FIGS. 1-16.
Figure 19:
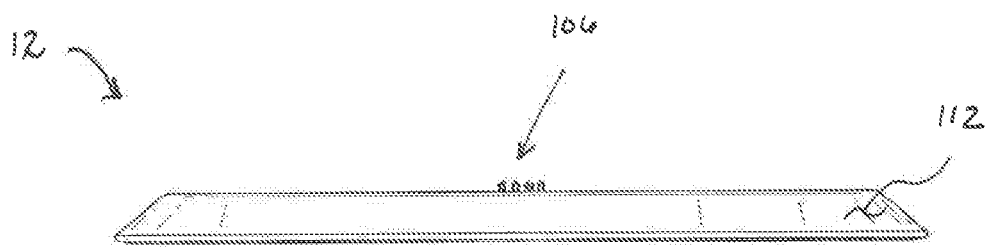
FIG. 19 is a front view of a charging plate compatible with any of the embodiments of the audio player shown in FIGS. 1-16.
Figure 20:
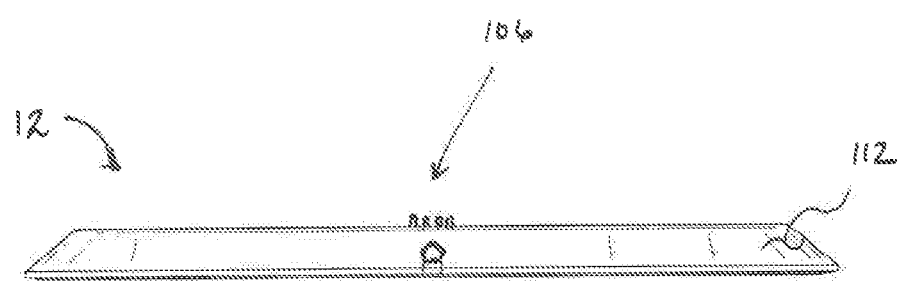
FIG. 20 is a rear view of a charging plate compatible with any of the embodiments of the audio player shown in FIGS. 1-16.
Figure 21:
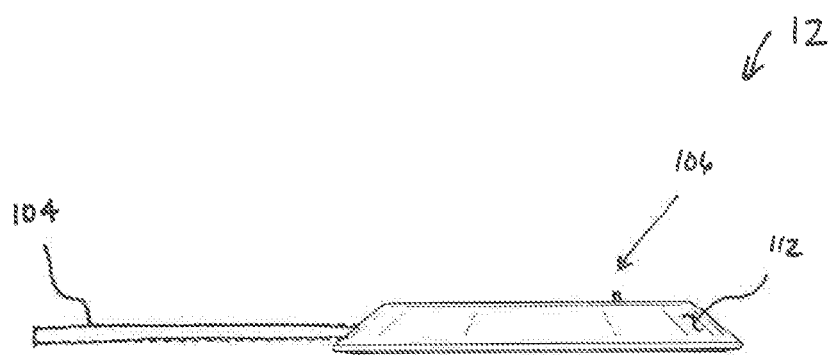
FIG. 21 is a left side view of a charging plate compatible with any of the embodiments of the audio player shown in FIGS. 1-16.
Figure 22:
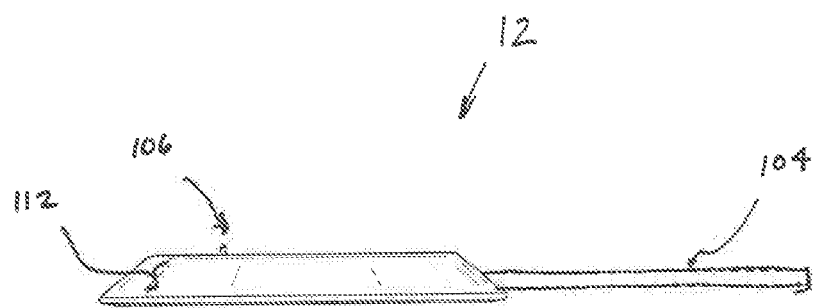
FIG. 22 is a right side view of a charging plate compatible with any of the embodiments of the audio player shown in FIGS. 1-16.
Figure 23:
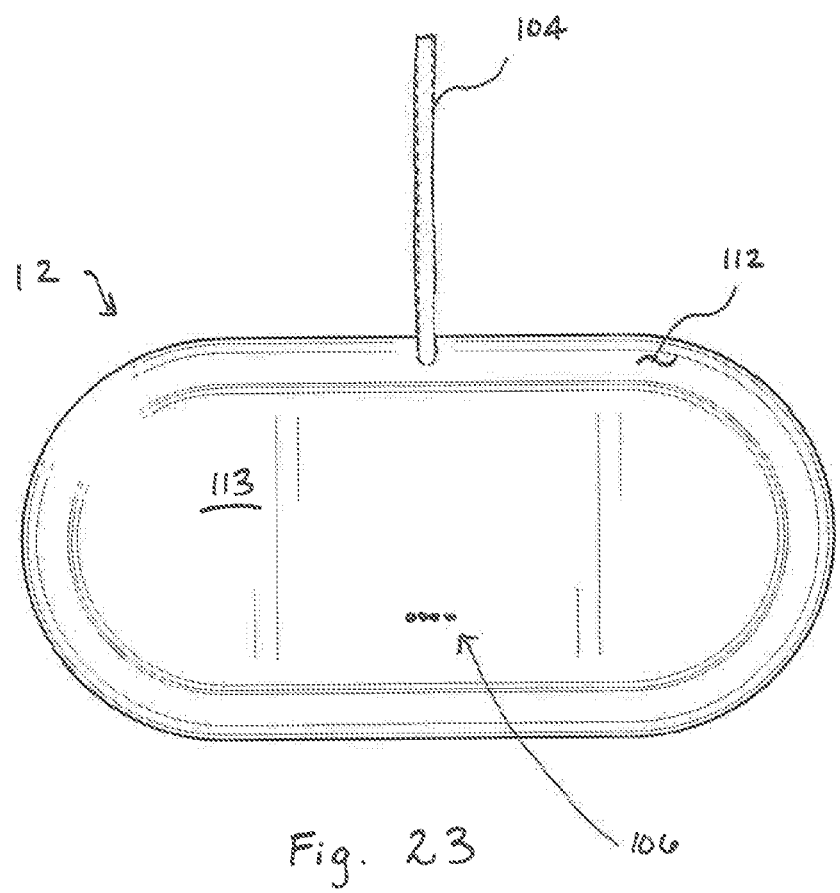
FIG. 23 is a top view of a charging plate compatible with any of the embodiments of the audio player shown in FIGS. 1-16.
Figure 24:
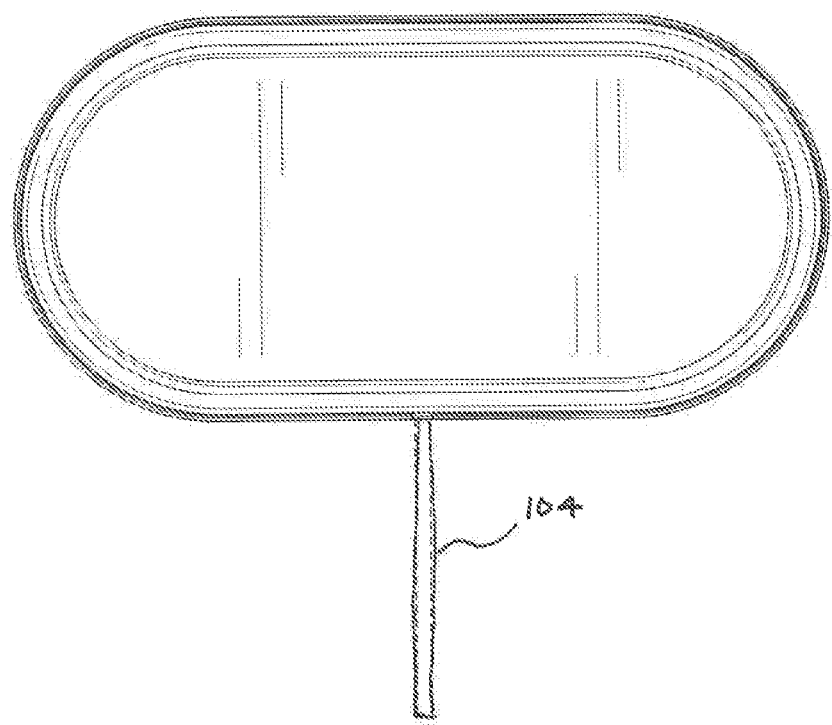
FIG. 24 is a bottom view of a charging plate compatible with any of the embodiments of the audio player shown in FIGS. 1-16.

As shown in detail in FIGS. 2, 4, and 8, boot 103 of body 100 comprises a recessed portion 107 and notch 105. In the illustrated embodiment, recessed portion 107 comprises charging contacts 109. In the embodiments shown, recessed portion 107 and notch 105 are configured to accept a charging base 12 and cord 104, respectively.

In certain embodiments, behavior of audio player 10 may change depending on the elapsed time between the last time the presence of a user was detected or the user's last interaction with audio player 10. For example, if audio is playing and a short time (e.g., less than 30, 25, 20, 15, 10, or 5 minutes) has elapsed since the user was last detected or last interacted with audio player 10, when the user's presence is detected by proximity sensor 138, only display 130 is activated and selection wheel 120 remains dim (e.g., the user may be leaning over to see what song is currently playing). If audio is playing and a long time has elapsed since the user was last detected (e.g., more than 30 minutes), display 130 activates and selection wheel 120 illuminates in the color palette associated with the active wheel select button.

In certain embodiments, behavior of audio player 10 may change depending on the elapsed time between the last time the presence of a user was detected and also on the time of day. For example, in the morning, when the presence of a user is detected by proximity sensor 138, a clock showing the time of day may be shown on display 130.

In certain embodiments, audio player 10 may be programmed with controller to begin playing at a certain time of day (i.e., as an alarm clock).

B. Charging Base

Embodiments of charging base 12 are shown in FIGS. 17-24. Charging base 12 comprises cord 104, sloped side surface 112, top surface 113, and charging pins 106 disposed on top surface 113. Recessed portion 107 of body 100 is or is substantially a volumetric negative of charging base 12. Body 100 will be urged into place on charging base 12 by the interaction between sloped side surface 112 of charging base 12 and recessed portion 107 of body 100, such that charging pins 106 are aligned with charging contacts 109 when a user sets audio player 10 on charging base 12.

In other embodiments, charging may be accomplished in other ways besides charging contacts and charging pins, such as through any standard USB cord. In certain embodiments, top surface 113 of charging base 12 may comprise a male USB adapter disposed on top surface 113, and recessed portion 107 may comprise a female USB adapter. A person of ordinary skill in the art would understand that other suitable power connectors may be used to charge the rechargeable battery, or that charging may be accomplished through inductive charging or another form of proximity charging.

In certain embodiments, a kit may be provided comprising audio player 10 and charging base 12. In other embodiments, a kit may be provided comprising audio player 10 and a charging cord.

C. Configuring Audio Player with a Controller

In the embodiments illustrated in FIGS. 1-16, audio player 10 is configurable using a controller 20. In certain embodiments, controller 20 is an application 200 that may be configured for display on a mobile phone, a tablet, a laptop, or a personal computer. In other embodiments, controller 20 is a webpage. In still other embodiments, controller 20 is a progressive web application. A person of ordinary skill in the art would understand that attributes, features, and functionalities described with respect to application 200 may be the same or substantially the same in the context of a webpage or progressive web application.

Figure 25:
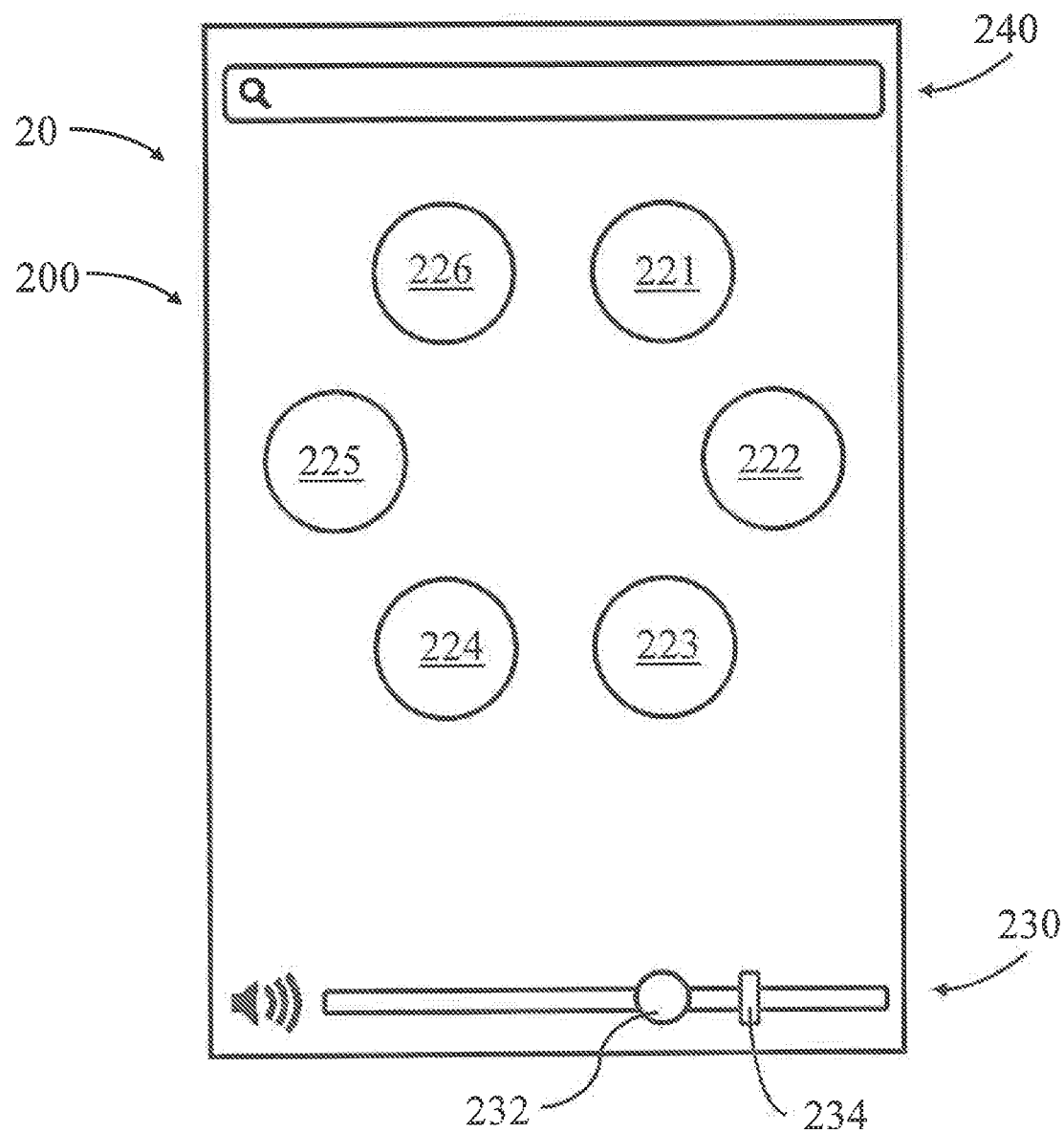
FIG. 25 depicts an embodiment of an application for programming and controlling any of the embodiments of the audio player shown in FIGS. 1-16.

An illustrative embodiment of application 200 is shown in FIG. 25.

Application 200 can program and control audio player 10. Specifically, in certain embodiments, application 200 is configured to assign audio sources to the assignable selection buttons 121, 122, 123, 124, 125, 126.

In certain embodiments, application 200 is configured to set a maximum volume for audio player 10, or to raise or lower the volume, or to control the audio being played (such as by selecting a song, raising the volume, or lowering the volume).

In certain embodiments, application 200 is used to restrict the times of day that audio player 10 may be operated. In certain embodiments, application 200 is used to change the color and/or brightness of the LEDs corresponding to the assignable selection buttons and/or control buttons, to enable or disable the animations of the LEDs associated with the assignable selection buttons. In still other embodiments, application 200 is used to disable or dim the LEDs based on the time of day. In still other embodiments, application 200 is used to limit the total number of hours and/or minutes in a 24 hour period or calendar day that audio player 10 may be used. In still other embodiments, application 200 is used to limit the number of times a certain song, album, or playlist may be played in a single day. In still other embodiments, application 200 is used to enable or disable parental content control settings.

In certain embodiments, application 200 is configured to display a content wheel 220, which comprises at least one slot. Content wheel 220 resembles the selection wheel 120, such that the number, color, and arrangement of slots displayed in the application 200 correspond or substantially correspond to the number, color, and arrangement of assignable selection buttons on body 100.

In the present embodiments, content wheel 220 comprises a first slot 221, a second slot 222, a third slot 223, a fourth slot 224, a fifth slot 225, and a sixth slot 226. Application 200 is configured to be paired with a digital audio source via an application or credentials associated with that audio source. In certain embodiments, the digital audio source may be one or more of iTunes, Spotify, Pandora, Tidal, YouTube, a podcast application, an audiobook application, or another streaming audio source. In certain embodiments, the digital audio source includes audio files stored locally on the device (e.g., phone, tablet, or computer) that is running the application. In certain embodiments, the locally stored audio files may be cached files from a streaming service.

In certain embodiments, application 200 is configured to save the audio sources that have been assigned to the content wheel. For example, if a user assigns audio sources to each of the slots of a first content wheel, the user may save the first content and then create a second content wheel. The user may then assign audio sources to each of the slots in the second content wheel. A person of ordinary skill in the art would recognize that, in this way, a user may easily switch between profiles for different users (e.g., if first content wheel had been programmed with music for 3- to 5-year-olds and second content wheel had been programmed with music for 10- to 12-year-olds) or appropriate to different times of day (e.g., if first content wheel had been programmed with upbeat music more suited to daytime use and if second content wheel had been programmed with soothing music more suited to nighttime use).

In certain embodiments, audio player 10 may be programmed to detect the type of audio source and to preserve the play location based on the type of audio source. For example, if the audio source is a single song, and the song is paused or audio player 10 is turned off in the middle of play, audio player 10 may be configured to play the song from the beginning. But if the audio source is a podcast or an audiobook, audio player 10 may be programmed to resume play at the point (or in some embodiments, between five and thirty seconds before the point) that audio player 10 was paused or turned off. In certain embodiments, such as when the audio source is a podcast channel, audio player 10 may be programmed to skip to the next podcast when audio player 10 is paused or turned off when less than a certain amount of time (e.g., less than a minute) remains in the podcast.

In the embodiments shown in FIG. 25, application 200 further comprises a volume slider 230. Volume slider 230 further comprises a volume selector 232 and a volume limiter 234. In these embodiments, a user can control the volume of audio player 10 by sliding volume selector 232 along volume slider 230. A user can also cap the maximum volume of audio player 10 by sliding volume limiter 234 along volume slider 230. In certain embodiments, a user can cause volume limiter 234 to appear by double tapping anywhere along volume slider 230. Following a double tap, volume limiter 234 appears at the site of the double tap. In certain embodiments, a user can cause the volume limiter 234 to disappear by double tapping volume limiter 234. In other embodiments, a user can cause the volume limiter to disappear by dragging it off of volume slider 230 (e.g., to the extreme left, the extreme right, up, or down relative to volume slider 230).

In the illustrated embodiments, application 200 further comprises a search bar 240. Using search bar 240, a user can search for audio content to assign to one or more of the slots of content wheel 220.

EXAMPLES

Example 1: Programming the Audio Player

One illustrative example of programming and using embodiments of audio player 10 shown and described in FIGS. 1-16 is as follows. A person of ordinary skill in the art will understand that this example is a non-limiting example, provided for clarity.

After connecting her phone to a wireless network, downloading application 200 to her phone and opening application 200, a user is prompted to create an account. The user is then prompted to associate the account with an audio player 10. Once the account has been associated with audio player 10, the user is then prompted to grant the audio player access to a wireless network.

The user is then prompted to link at least one digital audio source to her account. In this example, the user links her account with the streaming music services Spotify, Pandora, and YouTube Remix, the audiobook app Audible, and her iTunes app.

Once the user links her account with at least one digital audio source, the user is prompted to assign audio content to a first content wheel 220, comprising six slots 221, 222, 223, 224, 225, and 226. A content wheel is loaded to audio player 10, corresponding to any of wheel select buttons 191, 192, 193, or 193. Once the content wheel is then loaded to audio player 10 and associated with one of the four wheel select buttons, the content assigned to the slots 221, 222, 223, 224, 225, and 226 may be accessed using the assignable selection buttons 121, 122, 123, 124, 125, 126.

In this example, a user programs first content wheel 220 associated with first wheel select button 191. Using application 200, a user chooses to or is prompted to create and name a new wheel. The user names this wheel "Jane's Wheel." Using application 200, a user may then search or browse for content to assign to each of the six slots that make up Jane's Wheel, which may include a playlist, a podcast, a radio station, an album, an artist, or a single song, available via any linked streaming service or on local storage.

The user is prompted to or chooses to assign an audio source to first slot 221. In this example, the user searches for and selects a single song, "Let it Go." In certain embodiments, this causes the audio content associated with slot 221 to be automatically assigned to first assignable selection button 121 on audio player 10. In other embodiments, a user must take an action to assign the content in slot 221 or the entire content wheel such that when first assignable selection button 121 is selected and a user presses play, audio player 10 will play "Let it Go" on repeat.

The user is next prompted to or chooses to assign audio content to second slot 222. In this example, the user searches for and selects an album, London Calling by The Clash, which is then assigned to second assignable selection button 122, such that when second assignable 122 selection button is selected and a user presses play, audio player 10 will play the album London Calling by The Clash on repeat.

The user is then prompted to assign audio content to third assignable selection button 123 and/or third slot 223. The user selects Pandora, and the user is then prompted to select any audio content available via Pandora. In this example, the user selects The Cure Radio, which is then assigned to third assignable selection button 123, such that when third assignable selection button 123 is selected and a user presses play, audio player 10 will play a song from The Cure Radio.

The user is then prompted to assign audio content to fourth assignable selection button 124 and/or fourth assignable selection button 224. The user selects YouTube Remix, and is then prompted to select any audio content available via YouTube Remix. In this example, the user selects a custom playlist "Friday Dance Party," which is then assigned to fourth assignable selection button 124, such that when fourth assignable selection button 124 is selected and a user presses play, audio player 10 will play a song from the custom playlist "Friday Dance Party."

The user is then prompted to assign audio content to fifth assignable selection button 125 and/or fifth slot 225. The user selects Audible, and is then prompted to select any audio content available via Audible. In this example, the user selects an audiobook, "Flat Stanley," which is then assigned to fifth assignable selection button 125, such that when fifth assignable selection button 125 is selected and a user presses play, audio player 10 will play the audiobook "Flat Stanley."

The user is then prompted to assign audio content to sixth assignable selection button 126 and/or sixth slot 226. The user selects iTunes, and is then prompted to select any audio content available via iTunes. In this example, the user selects the album "1989" by Taylor Swift, such that when sixth assignable selection button 126 is selected and a user presses play, audio player 10 will play the album "1989" by Taylor Swift.

Once audio content has been assigned to each assignable selection button, in certain embodiments, the user is prompted to save the content wheel as a first saved content wheel, which preserves the audio sources that have been assigned to each slot. The user may then be prompted, in certain embodiments, to assign audio content to the assignable selection buttons corresponding to a second saved content wheel. In this way, the user may easily switch between audio sources appropriate for different users (e.g., a 3- to 5-year-old and a 10- to 12-year-old) or different times of day (daytime versus evening), different thematic groups (of podcasts, albums by a similar artist, albums by genre) or any other suitable grouping. A person of ordinary skill will understand that the user may perform substantially similar steps to those just described to assign audio content to each slot for the second saved content wheel. A person of ordinary skill in the art will understand that application 200 may be configured to store many saved content wheels, such as one, two, three, four, five, six, seven, eight, nine, ten, or more. A person of ordinary skill in the art will understand that application 200 may be used to assign saved content wheels to one of wheel select buttons 191, 192, 193, or 194.

With the illustrated embodiments of audio player 10 comprising six assignable selection buttons on selection wheel 120, and four wheel select buttons 190, a user may access twenty-four separate slots or channels to which content has been assigned directly from audio player 10. A person of ordinary skill in the art would understand that by adding more or fewer assignable selection buttons, or more or fewer wheel select buttons, or both, to audio player 10, the total number of slots or channels to which content may be assigned can be increased or decreased.

In still other embodiments, application 200 may comprise curated or pre-populated content wheels, such that a user need not individually assign audio content to each slot. For example, in such an embodiment, one wheel is labeled "Sleep," and is prepopulated with audio sources corresponding to each slot (e.g., "Music to Airports" for slot 221, Goldberg Variations Radio to slot 222, a Bill Evans custom playlist to slot 223, a Tolstoy audiobook to slot 224, rainforest sounds to slot 225, and white noise sounds to slot 226). The user may assign this curated or pre-populated content wheel to one of wheel select buttons 191, 192, 193, or 194, such that these audio sources are now accessible directly from audio player 10.

In certain embodiments the user is then prompted to enable or disable explicit content controls. In certain embodiments, when explicit content controls are enabled, any audio content (e.g., a song) that has been labeled explicit, (e.g., by the user or in the metadata associated with the audio content) or which a user has identified to be skipped, will be automatically skipped. In certain embodiments, if a user has assigned exclusively explicit audio content to an assignable selection button and the user enables explicit content controls, the user is prompted to assign different audio content to the assignable selection button.

Once the user has been prompted to enable or disable explicit content controls, in certain embodiments the user is then prompted to set a maximum volume for audio player 10. For example, in certain embodiments audio player 10 may have a maximum actual volume of 120 decibels, but the user may opt to set the maximum permitted volume at 85 decibels. In this example, when the volume of music player is set to 100%, audio player 10 will play audio only at the maximum permitted volume of 85 decibels, despite being capable of playing audio as loud as 120 decibels.

Once the user has been prompted to enable or disable explicit content controls, in certain embodiments the user is then prompted to select time and use restrictions. In certain embodiments, the user may restrict use of audio player to a certain number of hours in a day. In other embodiments, the user may restrict use by time of day, such that, for example, the music player may not be used before 6:00 A.M. or after 9:00 P.M. In still other embodiments, the user may restrict volume by time of day, such that, for example, the maximum volume is at 75 dB before 6:00 A.M., at 100 dB between 6:00 A.M. and 9:00 P.M., and at 75 dB after 9:00 P.M. In certain embodiments, the user may be prompted to enable sleep mode, in which audio player 10 will turn off after a certain time of day (e.g., 9:00 P.M.) and/or in which audio player 10 will turn off after being played for a certain amount of time after a certain time of day (e.g., after being played for more than one hour after 7:30 P.M.).

In certain embodiments, the user is prompted to select the number of times a song or playlist may be played in a day. For example, a user may limit the number of times the song "Let It Go," which was assigned to first assignable selection button 121, may be played to no more than fifty times in a calendar day or 24-hour period. In certain embodiments, the user is then prompted to select the next assignable selection button that is to be played once the fifty-times-in-a-day limit has been reached.

A person of ordinary skill in the art will understand that the steps described in this example need not be performed in the order described, and will further understand that a user need not necessarily be prompted to perform certain steps, such as assign audio content to each assignable selection button, enable explicit content controls, or enable time and volume limits. For example, in certain embodiments, the content wheel 220 is displayed on the home screen of the application and the user may simply select a slot to which to assign an audio source.

Once audio player 10 has been granted access to a wireless network and once an audio source has been assigned to at least one slot of a content wheel (and thus to at least one assignable selection button on audio player 10), and preferably once audio sources have been assigned to each of six slots corresponding to each of four content wheels (and thus to each wheel select button 191, 192, 193, and 194 on audio player 10), audio player 10 is programmed and ready for use.

Example 2: Navigating the Audio Player

A second example illustrates how a user may interact with audio player 10 once it has been loaded with content. A person of ordinary skill in the art will understand that this example, too, is a non-limiting example, provided for clarity.

In the illustrated embodiments, once content has been assigned to each of the twenty-four channels, a user may browse between them by using the assignable selection buttons on selection wheel 120 and wheel select buttons 190, as shown in the following illustrative example.

In this example, audio player 10 has had four different wheels assigned to it via application 200. The first wheel, corresponding to first wheel select button 191, is titled "Best of the Beatles," and when first wheel select button 191 is activated, comprises six Beatles albums: Sgt. Pepper's Lonely Hearts Club Band, assigned to first assignable selection button 121, Magical Mystery Tour, assigned to second assignable selection button 122, The Beatles (White Album), assigned to third assignable selection button 123, Yellow Submarine, assigned to fourth assignable selection button 124, Abbey Road, assigned to fifth assignable selection button 125, and Let It Be, assigned to sixth assignable selection button, 126.

The second wheel, corresponding to second wheel select button 192, is titled "Best of Jay-Z," and when second wheel select button 192 is activated, comprises six Jay-Z albums: Vol. 2 . . . Hard Knock Life, assigned to first assignable selection button 121, The Blueprint, assigned to second assignable selection button 122, The Black Album, assigned to third assignable selection button 123, The Blueprint 3, assigned to fourth assignable selection button 124, Watch the Throne, assigned to fifth assignable selection button 125, and Everything is Love, assigned to sixth assignable selection button, 126.

The third wheel, corresponding to third wheel select button 193, is titled "Best of Danger Mouse," and when third wheel select button 193 is activated, comprises six Danger Mouse albums: The Mouse & The Mask, assigned to first assignable selection button 121, St. Elsewhere, assigned to second assignable selection button 122, The Grey Album, assigned to third assignable selection button 123, Broken Bells, assigned to fourth assignable selection button 124, Dark Night of the Soul, assigned to fifth assignable selection button 125, and Lux Prima, assigned to sixth assignable selection button, 126.

The fourth wheel, corresponding to fourth wheel select button 194, is titled "Best of Bill Evans," and when fourth wheel select button 194 is activated, comprises six Bill Evans albums: Everybody Digs Bill Evans, assigned to first assignable selection button 121, On Green Dolphin Street, assigned to second assignable selection button 122, Sunday at the Village Vanguard, assigned to third assignable selection button 123, Bill Evans and Stan Getz, assigned to fourth assignable selection button 124, Waltz for Debbie, assigned to fifth assignable selection button 125, and Conversations with Myself, assigned to sixth assignable selection button, 126.

In this example, a user approaches audio player 10. The user's presence is detected by proximity sensor 138, causing display 130 to activate and selection wheel 120 to illuminate in a first color palette. The title of the first wheel, "The Best of the Beatles," is shown on display 130. The user may navigate between the albums assigned to the first wheel by briefly touching the wheel selection buttons. When the user touches first assignable wheel selection button 121, album art and metadata associated with Sgt. Pepper's Lonely Hearts Club Band appears on display 130 in a preview mode. In this example, the user may choose to play Sgt. Pepper's Lonely Hearts Club Band by pressing play/pause button 144 during preview mode. In certain other embodiments, when the user continues to hold first assignable wheel selection button 121, the action meter is shown on display 130 and begins to fill; once the user has held first assignable selection button 121 for a sufficient amount of time and action meter is filled, Sgt. Pepper's Lonely Hearts Club Band becomes the active selection. In certain embodiments, the other segments of selection wheel 120 dim and first assignable selection button 121 remains illuminated to indicate a successful selection. In certain embodiments, the audio content associated with a selection button begins to play automatically upon selection. In other embodiments, the user presses play/pause button 144 to play the album. Within a specified amount of time following the selection, the display and any illuminated LEDs will dim, even as audio continues to play.

While the album is playing, a user may browse within the Best of the Beatles wheel by touching other buttons on the selection wheel 120. In certain embodiments, when the user approaches audio player 10, selection wheel 120 again illuminates in a first color palette, while in other embodiments, selection wheel 120 illuminates in a first color palette when a user touches any of the buttons on selection wheel 120. By briefly touching second assignable wheel selection button 122, album art and metadata associated with Magical Mystery Tour is shown on display 130. If the user does not make a selection and does not press another button within a certain period of time, the display and the selection wheel will shut off. The user may continue to navigate around the wheel, browsing other albums and causing their metadata to display, by touching the other assignable selection buttons 123, 124, 125, and 126.

In this example, the user selects Magical Mystery Tour by pressing play/pause button 144 while album art and metadata associated with Magical Mystery Tour is shown on display 130.

In this example, audio player 10 is configured such that when the content associated with one assignable selection button is played through, content associated with the next assignable selection button in sequence begins to play. Thus, in this example, when Magical Mystery Tour ends, The Beatles (White Album) begins playing. In other embodiments, playback stops when the content associated with the current assignable selection button is played through. In other embodiments, playback returns to the beginning, so that when Magical Mystery Tour ends, it starts over again.

The user may also browse among other wheels without stopping playback. For example, the user may wish to browse the Best of Jay-Z wheel. To do so, the user touches second wheel select button 192, which causes the title of the second wheel, "The Best of Jay-Z" to be shown on the display and selection wheel 120 to illuminate in a second color palette. The user may browse within the Best of Jay-Z wheel by touching the other assignable selection buttons 122, 123, 124, 125, and 126. In this example, the user chooses to listen to The Black Album by pressing play/pause button 144 after touching third assignable selection button 123, while album art and metadata associated with The Black Album is displayed. In certain embodiments, selecting content from within a wheel activates that wheel. In certain embodiments, a wheel may be activated by double tapping a corresponding wheel select button 191, 192, 193, or 194. In other embodiments, the wheel may be activated by pressing and holding a corresponding wheel select button 191, 192, 193, or 194 for a sufficient amount of time.

Once the Best of Jay-Z wheel is activated, the color palette associated with the second wheel selection button is displayed. Continuing in this example, after a certain amount of time has elapsed from when the user last made a selection, touched a button, or was detected by presence sensor 138, the LED lights and display will dim. When a user approaches audio player 10 again after it has dimmed and the presence of the user is detected by presence sensor 138 or the user touches a button, display 130 will activate and selection wheel 120 will illuminate in a second color palette.

Continuing in this example, a user may stop playback and continue to browse. To stop playback, the user presses play/pause button 144, causing action meter to appear on display 130 and begin to fill. Once the user has held play/pause button for a sufficient amount of time, the action meter fills completely and the audio that was playing is paused. In certain other embodiments, the play/pause function is engaged substantially instantaneously when the user presses play/pause button 144 and no action meter is shown on display 130.

The user may then browse to the Best of Danger Mouse Wheel by touching third wheel select button 193, causing "Best of Danger Mouse" to be shown on display 130 and causing selection wheel 120 to illuminate in a third color palette. In other embodiments, user may activate the Best of Danger Mouse wheel by pressing and holding third wheel select button 193 until action meter appears, begins to fill, and fills completely. The difference between browsing a wheel and activating a wheel is that if a user is playing content from the Best of Jay-Z wheel and is browsing content in the Best of Danger Mouse wheel, and then does not make a selection, the Best of Jay-Z wheel remains the active wheel such that when a user approaches audio player 10, the color palette and information associated with the Best of Jay-Z wheel is displayed when the presence of a user is detected or when a user touches audio player 10. If instead a user activates the Best of Danger Mouse wheel, then the color palette and information associated with that wheel is displayed when the presence of a user is detected or when a user touches audio player 10.

Continuing in this example, playback behavior of audio player 10 changes depending on the time of day. For example, during the day (e.g., from 7:00 AM until 8:00 PM), a user may select content from among any of wheel select buttons 191, 192, 193, or 194. At night (e.g., between 8:00 PM and 7:00 AM), certain wheels may become inactive, such that a user may select only from among a more limited selection of wheels. In this example, the Best of the Beatles, Best of Jay-Z, and Best of Danger Mouse wheels become inactive between 8:00 PM and 7:00 AM, such that the user may select from content in the Best of Bill Evans wheel. Whether and which wheels become inactive and during which time periods may be set using control 20.

Illumination behavior may also change based on time of day. For example, during the day (e.g., from 7:00 AM until 8:00 PM, or between sunrise and sunset, or between a certain amount of time before or after sunrise and a certain amount of time before or after sunset), each wheel has a distinct color palette associated with it. At night (e.g., between 8:00 PM and 7:00 AM, or between sunset and sunrise, or between a certain amount of time before or after sunset and a certain amount of time before or after sunrise), the color palettes associated with each wheel may change to minimize blue light; may be dimmer at night than during the day; or may not illuminate at night. Similarly, display 130 may invert colors at night (e.g., display white text on a black background instead of black text on a white background), display only text instead of album art, or minimize blue light.

The invention claimed is:

1. A portable streaming audio player comprising:
 a body comprising:
  an interface panel comprising:
   a selection wheel comprising a first assignable selection button;
   a display;
   a control knob; and
   a first music control button;
  a boot comprising a notch, a recessed portion, and a first charging contact disposed within the recessed portion;
  a speaker driver attached to and supported by the boot;
  a speaker grille attached to the interface panel and the boot and surrounding the speaker driver;
  a processor;
  a wireless card; and
  a computer readable storage media.

2. The portable streaming audio player of claim 1, where the body further comprises a proximity sensor.

3. The portable streaming audio player of claim 1, where the body further comprises a capacitive touch mat, the capacitive touch mat comprising a first region corresponding to the first assignable selection button, a second region corresponding to the first music control button, and a third region corresponding to the wheel select button.

4. The portable streaming audio player of claim 1, where the body further comprises a first LED corresponding to the first assignable selection button.

5. The portable streaming audio player of claim 1, where the selection wheel further comprises a second assignable selection button, a third assignable selection button, a fourth assignable selection button, a fifth assignable selection button, and a sixth assignable selection button, and the body further comprises a first LED corresponding to the first assignable selection button, a second LED corresponding to the second assignable selection button, a third LED corresponding to the third assignable selection button, a fourth LED corresponding to the fourth assignable selection button, a fifth LED corresponding to the fifth assignable selection button, and a sixth LED corresponding to the sixth assignable selection button.

6. The portable streaming audio player of claim 5, where the interface panel further comprises a first wheel select button; a second wheel select button, a third wheel select button, and a fourth wheel select button.

7. The portable streaming audio player of claim 6, where the body further comprises a seventh LED corresponding to the first wheel select button, an eighth LED corresponding to the second wheel select button, a ninth LED corresponding to the third wheel select button, and a tenth LED corresponding to the fourth wheel select button.

8. The portable streaming audio player of claim 7, where the interface panel further comprises a second music control button and a third music control button.

9. The portable streaming audio player of claim 8, where the body further comprises an eleventh LED corresponding to the first music control button, a twelfth LED corresponding to the second music control button, and a thirteenth LED corresponding to the third music control button.

10. The portable streaming audio player of claim 1, further comprising a handle rotatably affixed to the body.

11. A portable streaming audio player comprising:
 a body comprising:
  an interface panel comprising:
   a selection wheel comprising:
    a first assignable selection button;
    a second assignable selection button;
    a third assignable selection button;
    a fourth assignable selection button;
    a fifth assignable selection button; and
    a sixth assignable selection button;
   a display;
   a control knob;
   music control buttons comprising:
    a back button;
    a play/pause button; and
    a forward button;
   wheel select buttons comprising:
    a first wheel select button;
    a second wheel select button;
    a third wheel select button; and
    a fourth wheel select button;
  a boot comprising a notch, a recessed portion, and a first charging contact disposed within the recessed portion;
  a speaker driver attached to and supported by the boot; a speaker grille attached to the interface panel and the boot and surrounding the speaker driver;
  a proximity sensor;
  a processor;
  a wireless card;
  a computer readable storage media;
  a first LED corresponding to the first assignable selection button; a second LED corresponding to the second assignable selection button;
  a third LED corresponding to the third assignable selection button;
  a fourth LED corresponding to the fourth assignable selection button;
  a fifth LED corresponding to the fifth assignable selection button; a sixth LED corresponding to the sixth assignable selection button;
  a seventh LED corresponding to the back button;
  an eighth LED corresponding to the play/pause button;
  a ninth LED corresponding to the forward button;
  a tenth LED corresponding to the first wheel select button;
  an eleventh LED corresponding to the second wheel select button;
  a twelfth LED corresponding to the third wheel select button; and
  a thirteenth LED corresponding to the fourth wheel select button.

12. The portable streaming audio player of claim 11, where each assignable selection button has a first state, a second state, a third state, and a fourth state such that an assignable selection button in its first state is configured to be associated with a first audio file and a first color, an assignable selection button in its second state is configured to be associated with a second audio file and a second color, an assignable selection button in its third state is configured to be associated with a third audio file and a third color, and an assignable selection button in its fourth state is configured to be associated with a fourth audio file and a fourth color.

13. The portable streaming audio player of claim 12, where:
 the first wheel select button is configured to be associated with the first assignable selection button in its first state, the second assignable selection button in its first state, the third assignable selection button in its first state, the fourth assignable selection button in its first state, the fifth assignable selection button in its first state, and the sixth assignable selection button in its first state;
 the second wheel select button is configured to be associated with the first assignable selection button in its second state, the second assignable selection button in its second state, the third assignable selection button in its second state, the fourth assignable selection button in its second state, the fifth assignable selection button in its second state, and the sixth assignable selection button in its second state;

the third wheel select button is configured to be associated with the first assignable selection button in its third state, the second assignable selection button in its third state, the third assignable selection button in its third state, the fourth assignable selection button in its third state, the fifth assignable selection button in its third state, and the sixth assignable selection button in its third state; and the fourth wheel select button is configured to be associated with the first assignable selection button in its fourth state, the second assignable selection button in its fourth state, the third assignable selection button in its fourth state, the fourth assignable selection button in its fourth state, the fifth assignable selection button in its fourth state, and the sixth assignable selection button in its fourth state.

14. The portable streaming audio player of claim 13, where the assignable selection buttons in their respective first states are configured to display a first color palette, the assignable selection buttons in their respective second states are configured to display a second color palette, the assignable selection buttons in their respective third states are configured to display a third color palette, and the assignable selection buttons in their respective fourth states are configured to display a fourth color palette, where each of the first, second, third, and fourth color palettes is distinct from the other color palettes.

15. The portable streaming audio player of claim 14, where the portable streaming audio player is further configured such that upon detecting the presence of a user, the selection wheel and the display illuminate.

16. The portable streaming audio player of claim 15, where the portable streaming audio player is further configured such that after an elapsed time during which audio is playing and no user input is received, the selection wheel and the display turn off.

17. The portable streaming audio player of claim 16, where the portable streaming audio player is further configured such that after an elapsed time during which audio is not playing and no input is received, the portable streaming audio player enters a sleep state.

18. The portable streaming audio player of claim 11, further configured to be associated with one or more streaming services.

19. The portable streaming audio player of claim 1 further comprising:

a charging base comprising a second charging contact, wherein the recessed portion of the boot of the portable streaming audio player is substantially a volumetric negative of the charging base such that the first charging contact of the portable streaming audio player is configured to align with and contact the second charging contact of the charging base when the portable streaming audio player is placed on the charging base.

* * * * *